(12) United States Patent
Davis et al.

(10) Patent No.: US 7,649,073 B2
(45) Date of Patent: Jan. 19, 2010

(54) POLYCARBONATE-POLY(ALKYLENE OXIDE) COPOLYMER COMPOSITIONS AND ARTICLES FORMED THEREFROM

(75) Inventors: Gary C. Davis, Albany, NY (US); Dibakar Dhara, Bangalore Karnataka (IN); Sarah Elizabeth Genovese, Delmar, NY (US); Katherine Glasgow, Wake Forest, NC (US); Gautam Madan, Rutherford, NJ (US); Patrick J. McCloskey, Watervliet, NY (US); Yohana Perez de Diego, Bergen op Zoom (NL); William D. Richards, Scotia, NY (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 241 days.

(21) Appl. No.: 11/763,942

(22) Filed: Jun. 15, 2007

(65) Prior Publication Data
US 2008/0312374 A1 Dec. 18, 2008

(51) Int. Cl.
*C08G 64/00* (2006.01)
*C08G 63/02* (2006.01)
(52) U.S. Cl. ............ 528/196; 264/176.1; 264/219; 264/239; 524/158; 524/414; 524/420; 524/451; 524/540; 524/611; 525/64; 525/65; 525/66; 525/420; 528/171; 528/176; 528/219
(58) Field of Classification Search ............ 264/176.1, 264/219, 239; 524/158, 414, 420, 451, 540, 524/611; 525/64, 65, 66, 420; 528/171, 528/176, 219
See application file for complete search history.

(56) References Cited

U.S. PATENT DOCUMENTS

| | | | |
|---|---|---|---|
| 3,686,355 | A | 8/1972 | Gaines, Jr. et al. |
| 4,069,151 | A | 1/1978 | Higley et al. |
| 4,134,936 | A | 1/1979 | Byrne et al. |
| 4,160,791 | A | 7/1979 | Higley et al. |
| 4,350,806 | A | 9/1982 | Wagener |
| 4,866,143 | A | 9/1989 | Gagnon et al. |
| 5,010,139 | A | 4/1991 | Yu |
| 5,260,129 | A | 11/1993 | Scholl et al. |
| 5,308,489 | A | 5/1994 | Dhein et al. |
| 5,344,910 | A | 9/1994 | Sybert |
| 5,360,889 | A | 11/1994 | Watanabe et al. |
| 5,455,310 | A | 10/1995 | Hoover et al. |
| 6,042,920 | A | 3/2000 | Chatterjee et al. |
| 6,093,559 | A | 7/2000 | Bookbinder et al. |
| 6,319,664 | B1 | 11/2001 | Bookbinder et al. |

FOREIGN PATENT DOCUMENTS

| GB | 1556898 | 11/1979 |
|---|---|---|
| WO | 9403544 | 2/1994 |
| WO | 9718265 | 5/1997 |

OTHER PUBLICATIONS

Lee, et al., Protein-resistant surfaces prepared by PEO-containing block copolymer surfactants, Journal of Biomedical Materials Research, 1989, pp. 351-368, vol. 23.

Johnston, et al., Plasma Deposition and Surface Characterization of Oligoglyme, Dioxane, and Crown Ether Nonfouling Films, Langmuir, 2005, pp. 870-881.

Iwasaki, et al., Preservation of platelet function on 2-methacryloyoxlethyl phosphorylcholine-graft polymer as compared to various water-soluble graft polymers, Journal of Biomedical Materials research, 2001, pp. 72-78.

Harder, et al., Molecular Conformation in Oligo(ethylene glycol)-Terminated Self-Assembled Monolayers on Gold and Silver Surfaces Determines Their Ability To Resist Protein Adsorption, Journal of Physical Chemistry Part B, 1998, pp. 426-436, vol. 102.

Grainger, et al., In vitro and ex vivo platelet interactions with hydrophobic poly(ethylene oxide)-polystyrene multiblock copolymers, Journal of Biomedical Materials Research, 1989, 979-1005, vol. 23.

Desai, et al., Biological responses to polyethylene oxide modified polyethylene terephthalate surfaces, Journal of Biomedical Materials Research, 1991, 829-843, vol. 25.

Chen, et al., Detection of Hydrophobic End Groups on Polymer Surfaces by Sum-Frequency Generation Vibrational Spectroscopy, Journal of the American Chemical Society, 2000, pp. 10615-10620.

Clare, et al., Functional Monolayers for Improved Resistance to Protein Adsorption: Oligo(ethylene glycol)-Modified Silicon and Diamond Surfaces, Langmuir, 2005, pp. 6344-6355.

(Continued)

*Primary Examiner*—Terressa M Boykin

(57) ABSTRACT

Disclosed herein is a polycarbonate copolymer comprising A) a structure derived from a dihydroxy alkylene oxide compound selected from the group consisting of formula (1a) and formula (1b):

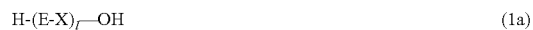

H-(E-X)$_l$—OH (1a)

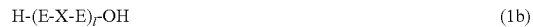

H-(E-X-E)$_l$-OH (1b)

wherein E and X are different and each and independently are selected from the group consisting of formula (2a) and formula (2b):

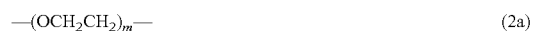

—(OCH$_2$CH$_2$)$_m$— (2a)

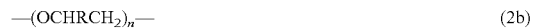

—(OCHRCH$_2$)$_n$— (2b)

wherein R is a $C_{1-8}$ alkyl group; l, m, and n are integers greater than or equal to 1; and wherein the weight average molecular weight of the total amount of the structures corresponding to formula (2b) in the copolymer is between 100 and 2,000 g/mol; and B) a structure derived from a dihydroxy aromatic compound, wherein the weight percentages are based on the total weight of the structures of A) and B).

36 Claims, 2 Drawing Sheets

OTHER PUBLICATIONS

Chen, et al., Surface properties of PEO-silicone composites: reducing protein adsorption, Journal of Biomaterials Science Polymer Edition, 2005, pp. 531-548, vol. 16, No. 4.

Amiji, et al., Prevention of protein adsorption and platelet adhesion on surfaces by PEO/PPO/PEO triblock copolymers, Biomaterials, 1992, pp. 682-692, vol. 13, No. 10.

De 4200320, published Jul. 15, 1993, Machine Translation, 15 pages.

Yoo, et al., Properties of Crosslinked Blends of Pellethene and Multiblock Polyurethane Containing Poly(ethylene oxide) for Biomaterials, Journal of Applied Polymer Science, 2003, pp. 2349-2357.

Takahara, et al., Effect of hydrophilic soft segment side chains on the surface properties and blood compatibility of segmented poly(urethaneureas), Journal of Biomedical Materials Research, 1991, pp. 1095-1118, vol. 25.

Sofia, et al., Poly(ethylene oxide) Grafted to Silicon Surfaces: Grafting Density and Protein Adsorption, Macromolecules, 1998, pp. 5059-5070.

Rainbow, et al., Biomaterials with permanent hydrophilic surfaces and low protein adsorption properties, Journal of Biomaterials Science Polymer Edition, 1994, pp. 91-109, vol. 6, No. 1.

Ostuni, et al., A Survey of Structure-Poperty Relationships of Surfaces that Resist the Adsorption of Protein, Langmuir, 2001, pp. 5605-5621.

Prime, et al., Adsorption of Proteins onto Surfaces Cintaining End-Attached Oligo(ethylene oxide): A Model System Using Self-Assembled Monolayers, Journal of American Chemical Society, 1993, pp. 10714-10721.

Oishi, et al., Synthesis of Terpolymers Having a Phospholipid Polar Group and Poly(oxyethylene) in the Side Chain and Their Protein Adsorption-Resistance Properties, Journal of Applied Polymer Science, 2002, pp. 1092-1105.

Mcpherson, et al., Prevention of Protein Adsorption by Tethered Poly(ethylene oxide) Layers: experiments and Single-Chain Mean-Field Analysis, Langmuir, 1998, pp. 176-186.

Lopez, et al., Glow discharge plasma deposition of tetraethylene glycol dimethyl ether for fouling-resistant biomaterial surfaces, Journal of Biomedical Materials Research, 1992, pp. 415-439, vol. 26.

Lee, et al., Platelet and bacterial repellance on sulfonated poly(ethylene glycol)-acrylate copolymer surfaces, Colloids and Surfaces B: Biointerfaces, 2000, pp. 355-370.

ASTM D1003-00, Standard Test Method for Haze and Luminous Transmittance of Transparent Plastics, 6 pages.

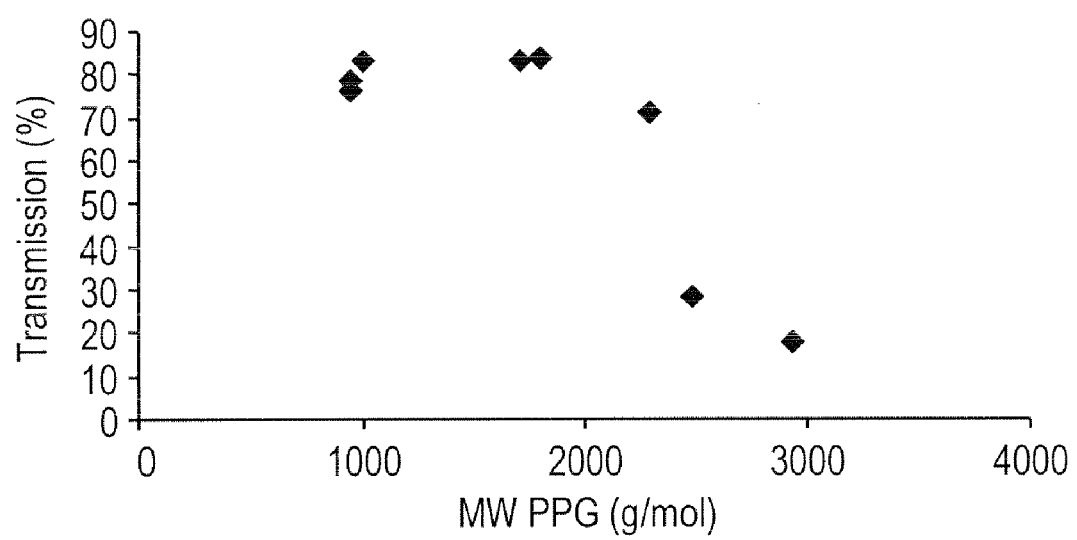

POLYCARBONATE-POLY(ALKYLENE OXIDE) COPOLYMER COMPOSITIONS AND ARTICLES FORMED THEREFROM

BACKGROUND OF THE INVENTION

This disclosure relates to polycarbonates, and in particular to polycarbonate-poly(alkylene oxide) copolymers, blends with polycarbonates, and uses thereof.

Polycarbonates are useful in the manufacture of articles and components for a wide range of applications including medical devices. Polycarbonates having excellent attributes including an inherently (i.e., permanently) hydrophilic surface are particularly desirable for such devices. A permanently hydrophilic polycarbonate surface is important for applications where the ability of water to wet a surface is critical. Such applications include filters and membranes where a hydrophilic surface is needed to prevent air bubbles and to improve flow through a membrane.

It is known in the art that copolycarbonates can be made with poly(ethylene oxide) (also referred to herein as "poly(ethylene glycol)") blocks to improve surface wettability. At least in part because of their good hemocompatibility properties, such polycarbonates are useful in medical packaging applications. However, polycarbonates with PEG blocks can have low glass transition temperatures and are therefore less able to withstand high temperature and high pressure sterilization (autoclave) conditions without deformation compared to polycarbonates having none or a lower amount of units derived from ethylene oxide. Conversely, increased levels of carbonate units based on bisphenols such as bisphenol A that would provide the requisite thermal deformation resistance generally have higher surface contact angle and can result in reduced hemocompatibility. However, increased levels of the ethylene oxide units can also lead to increased haze in the compositions.

There accordingly remains a need in the art for polycarbonates that have improved surface wettability, together with other advantageous properties, such as thermal stability, hemocompatibility, anti-fogging, and improved transparency.

SUMMARY OF THE INVENTION

The above-described and other deficiencies of the art are met by a thermoplastic composition comprising a polycarbonate copolymer comprising A) 5 to 30 weight percent of a structure derived from a dihydroxy alkylene oxide compound selected from the group consisting of formula (1a) and formula (1b):

  (1a)

  (1b)

wherein E and X are different and each and independently are selected from the group consisting of formula (2a) and formula (2b):

  (2a)

  (2b)

wherein R is a $C_{1-8}$ alkyl group; l, m, and n are integers greater than or equal to 1; and wherein the weight average molecular weight of the total amount of the structures corresponding to formula (2b) in the copolymer is between 100 and 2,000 g/mol; and B) 70 to 95 weight percent of a structure derived from a dihydroxy aromatic compound, wherein the weight percentages are based on the total weight of the structures of A) and B).

In another embodiment, a polycarbonate copolymer comprises A) 5 to 30 weight percent of a structure derived from a dihydroxy alkylene oxide compound selected from the group consisting of formula (1a) and formula (1b):

  (1a)

  (1b)

wherein E and X are different and each and independently are selected from the group consisting of formula (2a) and formula (2b):

  (2a)

  (2b)

wherein R is a $C_{1-8}$ alkyl group; l, m, and n are integers greater than or equal to 1; and wherein the weight average molecular weight of the total amount of the structures corresponding to formula (2b) in the copolymer is between 100 and 2,000 g/mol; and B) 70 to 95 weight percent of a structure derived from a dihydroxy aromatic compound, wherein the weight percentages are based on the total weight of the structures of A) and B), and wherein the polycarbonate comprises structural units derived from an activated aromatic carbonate.

In another embodiment, a method of preparing a polycarbonate copolymer comprises copolymerizing: A) 5 to 30 weight percent of a dihydroxy alkylene oxide compound selected from the group consisting of formula (1a) and formula (1b):

  (1a)

  (1b)

wherein E and X are different and each and independently are selected from the group consisting of formula (2a) and formula (2b):

  (2a)

  (2b)

wherein R is a $C_{1-8}$ alkyl group; l, m, and n are integers greater than or equal to 1; and wherein the weight average molecular weight of the total amount of the structures corresponding to formula (2b) in the copolymer is between 100 and 2,000 g/mol; and B) 70 to 95 weight percent of a dihydroxy aromatic compound, wherein the weight percentages are based on the total weight of the structures of A) and B); with a carbonylating agent.

In another embodiment, a method comprises reacting together, in the presence of a catalyst: A) 5 to 30 weight percent of a dihydroxy alkylene oxide compound selected from the group consisting of formula (1a) and formula (1b):

  (1a)

  (1b)

wherein E and X are different and each and independently are selected from the group consisting of formula (2a) and formula (2b):

  (2a)

  (2b)

wherein R is a $C_{1-8}$ alkyl group; l, m, and n are integers greater than or equal to 1; and wherein the weight average molecular weight of the total amount of the structures corresponding to formula (2b) in the copolymer is between 100 and 2,000 g/mol; and B) 70 to 95 weight percent of a dihydroxy aromatic compound, wherein the weight percentages are based on the total weight of the structures of A) and B); and one or more activated diaryl carbonate of the formula (12):

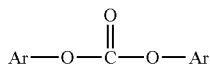
(12)

wherein Ar is a substituted $C_{6-30}$ aromatic group.

In another embodiment, a polycarbonate copolymer comprises: A) a structural unit derived from a dihydroxy alkylene oxide compound selected from the group consisting of formula (1a) and formula (1b):

$$H\text{-}(E\text{-}X)_l\text{—}OH \quad (1a)$$

$$H\text{-}(E\text{-}X\text{-}E)_l\text{-}OH \quad (1b)$$

wherein E and X are different and each and independently are selected from the group consisting of formula (2a) and formula (2b):

$$\text{—}(OCH_2CH_2)_m\text{—} \quad (2a)$$

$$\text{—}(OCHRCH_2)_n\text{—} \quad (2b)$$

wherein R is a $C_1$-$C_8$ alkyl group; l, m, and n are integers greater than or equal to 1; and B) a structural unit derived from a high-heat monomer comprising a dihydroxy aromatic compound of formula (7):

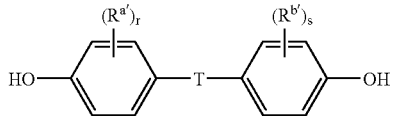
(7)

wherein $R^{a'}$ and $R^{b'}$ are each independently $C_{1-12}$ alkyl, T is a $C_{5-16}$ cylcloalkylidene or $C_{6-16}$ heterocycloarylene having up to three heteroatoms in the ring, wherein T is connected to at least one atom of each aromatic ring in the dihydroxy aromatic compound, wherein the heteroatoms include —O—, —S—, or —N(Z)-, and Z is hydrogen, halogen, hydroxy, $C_{1-12}$ alkyl, $C_{1-12}$ alkoxy, $C_{6-12}$ aryl, or $C_{1-12}$ acyl, and wherein r and s are each independently 0 to 4.

In an embodiment, a polycarbonate copolymer, comprises: A) a structural unit derived from a dihydroxy alkylene oxide compound selected from the group consisting of formula (1a) and formula (1b):

$$H\text{-}(E\text{-}X)_l\text{—}OH \quad (1a)$$

$$H\text{-}(E\text{-}X\text{-}E)_l\text{-}OH \quad (1b)$$

wherein E and X are different and each and independently are selected from the group consisting of formula (2a) and formula (2b):

$$\text{—}(OCH_2CH_2)_m\text{—} \quad (2a)$$

$$\text{—}(OCHRCH_2)_n\text{—} \quad (2b)$$

wherein R is a $C_1$-$C_8$ alkyl group; l, m, and n are integers greater than or equal to 1; and B) a structural unit derived from a high-heat monomer comprising a dihydroxy aromatic compound of formula (7):

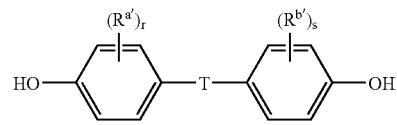
(7)

wherein $R^{a'}$ and $R^{b'}$ are each independently $C_{1-12}$ alkyl, T is a $C_{5-16}$ cylcloalkylidene or $C_{6-16}$ heterocycloarylene having up to three heteroatoms in the ring, wherein T is connected to at least one atom of each aromatic ring in the dihydroxy aromatic compound, wherein the heteroatoms include —O—, —S—, or —N(Z)-, and Z is hydrogen, halogen, hydroxy, $C_{1-12}$ alkyl $C_{1-12}$ alkoxy, $C_{6-12}$ aryl, or $C_{1-12}$ acyl, wherein r and s are each independently 0 to 4, and wherein the polycarbonate comprises structural units derived from an activated aromatic carbonate.

In an embodiment, a method of preparing a polycarbonate copolymer comprises copolymerizing: A) a dihydroxy alkylene oxide compound selected from the group consisting of formula (1a) and formula (1b):

$$H\text{-}(E\text{-}X)_l\text{—}OH \quad (1a)$$

$$H\text{-}(E\text{-}X\text{-}E)_l\text{-}OH \quad (1b)$$

wherein E and X are different and each independently are selected from the group consisting of formula (2a) and formula (2b):

$$\text{—}(OCH_2CH_2)_m\text{—} \quad (2a)$$

$$\text{—}(OCHRCH_2)_n\text{—} \quad (2b)$$

wherein R is a $C_1$-$C_8$ alkyl group; l, m, and n are integers greater than or equal to 1; and B) a high heat monomer comprising a dihydroxy aromatic compound of formula (7):

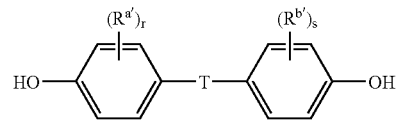
(7)

wherein $R^{a'}$ and $R^{b'}$ are each independently $C_{1-2}$ alkyl, T is a $C_{5-16}$ cylcloalkylidene or $C_{5-16}$ heterocycloarylene having up to three heteroatoms in the ring, wherein T is connected to at least one atom of each aromatic ring in the dihydroxy aromatic compound, wherein the heteroatoms include —O—, —S—, or —N(Z)-, and Z is hydrogen, halogen, hydroxy, $C_{1-12}$ alkyl, $C_{1-12}$ alkoxy, $C_{6-12}$ aryl, or $C_{1-12}$ acyl, and wherein r and s are each independently 0 to 4; and a carbonylating agent.

In another embodiment, a method comprises reacting together, in the presence of a catalyst: A) a dihydroxy alkylene oxide compound selected from the group consisting of formula (1a) and formula (1b):

$$H\text{-}(E\text{-}X)_l\text{—}OH \quad (1a)$$

$$H\text{-}(E\text{-}X\text{-}E)_l\text{-}OH \quad (1b)$$

wherein E and X are different and each independently are selected from the group consisting of formula (2a) and formula (2b):

—(OCH₂CH₂)ₘ— (2a)

—(OCHRCH₂)ₙ— (2b)

wherein R is a $C_1$—$C_8$ alkyl group; l, m, and n are integers greater than or equal to 1; B) a high heat monomer comprising a dihydroxy aromatic compound of formula (7):

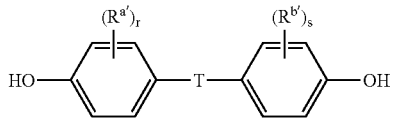

(7)

wherein $R^{a'}$ and $R^{b'}$ are each independently $C_{1-12}$ alkyl, T is a $C_{5-16}$ cylcloalkylidene or $C_{5-16}$ heterocycloarylene having up to three heteroatoms in the ring, wherein T is connected to at least one atom of each aromatic ring in the dihydroxy aromatic compound, wherein the heteroatoms include —O—, —S—, or —N(Z)-, and Z is hydrogen, halogen, hydroxy, $C_{1-12}$ alkyl, $C_{1-12}$ alkoxy, $C_{6-12}$ aryl, or $C_{1-12}$ acyl, and wherein r and s are each independently 0 to 4; and one or more activated diaryl carbonate of the formula (12):

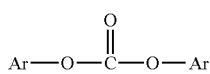

(12)

wherein Ar is a substituted $C_{6-30}$ aromatic group.

In another embodiment, an article comprises the polycarbonate compositions.

A description of the figures, which are meant to be exemplary and not limiting, is provided below.

BRIEF DESCRIPTION OF THE FIGURES

FIG. 3 is a plot of percent transmittance (% T) versus Mw of PPG for exemplary PEG/PPG polycarbonate copolymers;

Figure 1:
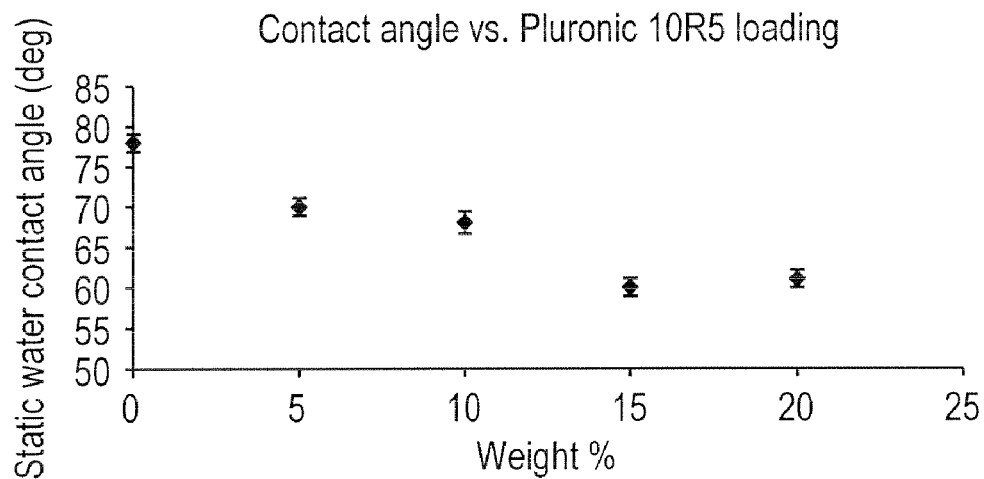
FIG. 1 is a plot of contact angle versus loading of PEG-PPG for exemplary PEG/PPG polycarbonate copolymers.

The above described and other features are exemplified by the following detailed description.

DETAILED DESCRIPTION OF THE INVENTION

Described herein is a polycarbonate copolymer (also referred to as a "copolycarbonate") derived from: a dihydroxy aromatic compound; and a dihydroxy alkylene oxide compound, specifically a dihydroxy poly(alkylene oxide) block copolymer. In one embodiment, the dihydroxy aromatic compound can comprise a bisphenol, and the dihydroxy poly(alkylene oxide) block copolymer comprises at least one poly(ethylene oxide) block and at least one poly(alkylene oxide) block that is not identical to the poly(ethylene oxide) block. In another embodiment, the dihydroxy aromatic compound comprises a high heat monomer. The polycarbonate copolymers, and thermoplastic compositions prepared therefrom, have improved surface contact angle as well as other advantageous properties, such as improved hemocompatibility, wettability, and haze and/or transparency. The copolycarbonates are particularly useful in medical applications.

Polycarbonates, as used herein, include polymers having carbonate linkages. In particular, polycarbonates including the copolycarbonates described herein have repeating carbonate structural units of the formula (3):

(3)

wherein the $R^1$ groups are derived from dihydroxy aromatic compounds as described in detail below.

The polycarbonate copolymer generally comprises structural units where at least a portion of the $R^1$ groups derive from dihydroxy aromatic compounds having a bisphenol structure. In one embodiment, the dihydroxy aromatic compound comprises units derived from a bisphenol of the formula (4):

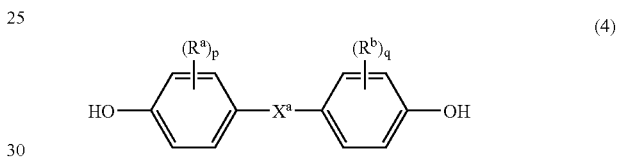

(4)

wherein $R^a$ and $R^b$ each independently represent a halogen or $C_{1-12}$ alkyl; p and q are each independently integers of 0 to 4. It will be understood that when p and/or q is 0, the valency will be filled by a hydrogen atom. Also in formula (4), $X^a$ represents a bridging group connecting the two hydroxy-substituted aromatic groups (i.e., hydroxy-substituted $C_6$ arylene groups such as, for example, phenol or o-cresol), where the bridging group and the hydroxy substituent of the $C_6$ arylene group are disposed para to each other on the $C_6$ arylene group. In an embodiment, the bridging group $X^a$ is a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group.

In an embodiment, $X^a$ is —O—, —S—, —S(O)—, —S(O)₂—, or one of the groups of formula (5):

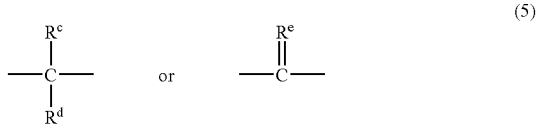

(5)

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylene group or a $C_{6-16}$ arylene group.

In still another embodiment, $X^a$ is an acyclic $C_{1-18}$ alkylidene group, a $C_{3-18}$ cycloalkylidene group (except for a cyclohexylidene), or a $C_{2-18}$ heterocycloalkylidene group, i.e., a cycloalkylidene group having up to three heteroatoms in the ring, wherein the heteroatoms include —O—, —S—, or —N(Z)-, where Z is hydrogen, halogen, hydroxy, $C_{1-12}$ alkyl, $C_{1-12}$ alkoxy, or $C_{1-12}$ acyl.

$X^a$ can be a substituted $C_{3-18}$ cycloalkylidene of the formula (6):

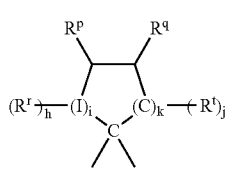

(6)

wherein each $R^r$, $R^p$, $R^q$, and $R^t$ is independently hydrogen, halogen, oxygen or $C_{1-12}$ organic group; I is a direct bond, a carbon, or a divalent oxygen, sulfur, or —N(Z)- wherein Z is hydrogen, halogen, hydroxy, $C_{1-12}$ alkyl, $C_{1-12}$ alkoxy, or $C_{1-12}$ acyl; h is 0 to 2, j is 0 to 2, i is 0 or 1, and k is 0 to 3, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ an $R^p$ taken together form a second aromatic group.

In a specific embodiment, a bisphenol that differs from the bisphenol of formula (4) and is copolymerized therewith to provide the copolycarbonate is derived from a dihydroxy aromatic compound having the formula (4a):

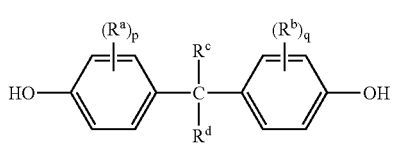

(4a)

wherein $R^a$ and $R^b$ are each independently halogen or $C_{1-12}$ alkyl; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; and p and q are each independently 0 to 4.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3methylphenyl)cyclohexane 1,1-bis(4-hydroxyphenyl)isobutene, 1,1-bis (4-hydroxyphenyl)cyclododecane, trans-2,3-bis(4-hydroxyphenyl)-2-butene, 2,2-bis(4-hydroxyphenyl) adamantine, (alpha,alpha'-bis(4-hydroxyphenyl)toluene, bis (4-hydroxyphenyl)acetonitrile, 2,2-bis-(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, and 9,9-bis(4-hydroxyphenyl)fluorene, 3,3-bis(4-hydroxyphenyl) phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (4) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane. Combinations comprising at least one of the foregoing dihydroxy aromatic compounds can also be used.

In a more specific embodiment, a bisphenol monomer of formula (3) comprises, but is not limited to, a dihydroxy aromatic compound of the formula (7):

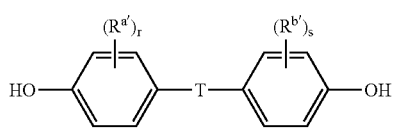

(7)

wherein $R^{a'}$ and $R^{b'}$ are each independently $C_{1-12}$ alkyl, T is a $C_{5-16}$ cycloalkylene, a $C_{5-16}$ cylcloalkylidene, a $C_{1-5}$ alkylene, a $C_{1-5}$ alkylidene, a $C_{6-13}$ arylene, a $C_{7-12}$ arylalkylene, $C_{7-12}$ arylalkylidene, a $C_{7-12}$ alkylarylene, or a $C_{7-12}$ arylenealkyl, and r and s are each independently 1 to 4. T is connected to at least one atom of each aromatic ring in the dihydroxy aromatic compound. Each of the foregoing groups are unsubstituted or substituted with an alkyl, aryl, alkoxy, or aryloxy group (up to the indicated total number of carbon atoms), halogen, —CN, —$NO_2$, —SH, or —OH. Combinations of the substituents can be present.

In a specific embodiment, T is a $C_{5-16}$ cylcloalkylidene or $C_{5-16}$ heterocycloarylene of general formula (6) having up to three heteroatoms in the ring. The heteroatoms include —O—, —S—, or —N(Z)-, where Z is hydrogen, halogen, hydroxy, $C_{1-12}$ alkyl, $C_{1-12}$ alkoxy, $C_{6-12}$ aryl, or $C_{1-12}$ acyl, and wherein r and s are each independently 0 to 4. T can be unsubstituted or substituted with one or more of alkyl, aryl, alkoxy, or aryloxy group (up to the indicated total number of carbon atoms), halogen, —CN, —NO$_2$, —SH, or —OH. In addition, T is connected to at least one atom of each aromatic ring in the dihydroxy aromatic compound, and can therefore have a single point of attachment to each phenolic ring of the bisphenol, or can form a fused and/or polycyclic ring system with the bisphenols.

Specifically, the units of formula (3) can be derived from a monomer comprising a $C_6$ cycloalkylidene-bridged bisphenol of formula (8):

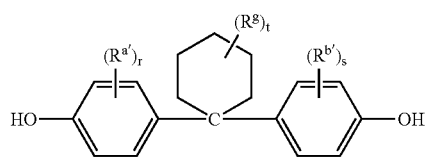

(8)

wherein $R^{a'}$ and $R^{b'}$ are each independently $C_{1-12}$ alkyl, $R^g$ is $C_{1-12}$ alkyl or halogen, r and s are each independently 0 to 4, and t is 0 to 10. It will be understood that hydrogen fills each valency when r is 0, s is 0, and t is 0. In a specific embodiment, where r and/or s is 1 or greater, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3.

In a specific embodiment, the cyclohexylidene bridged bisphenol of formula (8) can be a 1,1-bis(4-hydroxy-3-methylphenyl)cyclohexane ("DMBPC"), having the formula (8a):

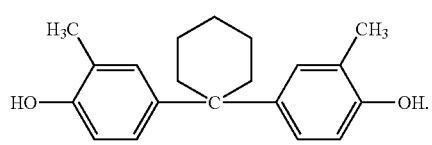

(8a)

In a further embodiment, at least a portion of the $R^1$ groups of formula (3) are derived from a high heat monomer. A high heat monomer is a dihydroxy compound which, when polymerized into a polycarbonate homopolymer, imparts a higher glass transition temperature than would be obtained with a polycarbonate homopolymer derived from bisphenol A monomer. High heat monomers can be derived from dihydroxy aromatic compounds of formulas (7) or (8). For example, in a specific embodiment, a high heat monomer can be a cycloalkylidene-bridged bisphenol of formula (8), comprising the reaction product of two moles of phenol with one mole of a hydrogenated isophorone (e.g., 1,1,3-trimethyl-1-cyclohexane-5-one). Such a high heat monomer can have the formula (8b):

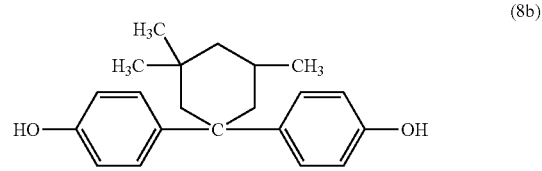

(8b)

wherein the monomer of formula (8b) is marketed under the tradename "APEC®" by Bayer Corporation and is referred to generally as "bisphenol isophorone" ("BPI").

In another specific embodiment, as a high heat monomer, the cycloalkylidene-bridged bisphenol is a cyclopentadienyl-bridged bisphenol derived from the reaction of 5-cyclopentadienone with two moles of phenol, as shown in the formula (8c), and referred to as "tricyclopentadienyl bisphenol" ("TCDBP"):

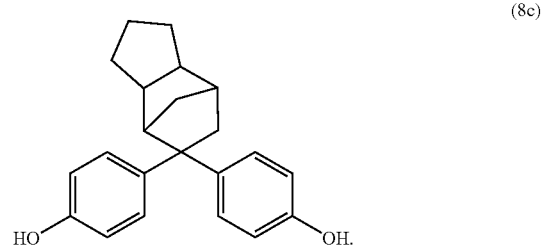

(8c)

In another embodiment, the high heat monomer can comprise a spiro-bridged, fused ring dihydroxyaromatic compound of the formula (9):

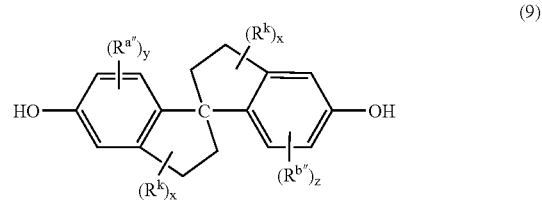

(9)

wherein $R^{a''}$, $R^{b''}$, and $R^k$ are independently $C_{1-12}$ hydrocarbyl, each x is independently an integer from 0 to 4, and y and z are each independently an integer from 0 to 3. In a more specific embodiment, the dihydroxyaromatic compound has the formula (9a):

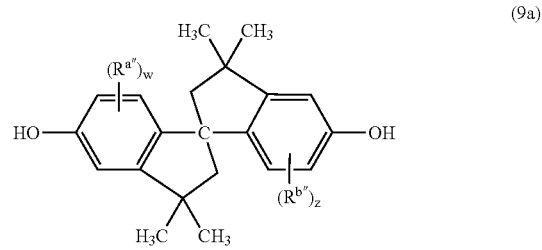

(9a)

wherein $R^{a''}$, $R^{b''}$ are independently $C_{1-4}$ alkyl, $C_{1-4}$ alkoxy, and y and z are each independently 0 or 1. In an exemplary embodiment, where w and z are 0, the high heat monomer is 6,6'-dihydroxy-3,3,3',3'-tetramethylspiro(bis)indane ("spirobiindane bisphenol").

In another specific embodiment, T in the high heat monomer of formula (7) is a substituted, fused $C_{5-18}$ heterocycloalkylidene of the formula (6), forming a fused heteroaromatic ring. In a specific embodiment, the high heat monomer has the formula (10):

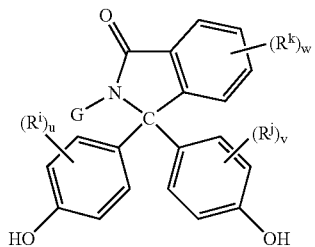

(10)

wherein $R^i$, $R^j$, and $R^k$ are independently $C_{1-12}$ hydrocarbyl, G is H, a $C_{1-12}$ alkyl, or $C_{6-18}$ aromatic group, and u, v, and w are each independently an integer from 0 to 4. In an exemplary embodiment, the high heat monomer is 2-phenyl-3,3-bis(4-hydroxyphenyl)phthalimidine ("PPPBP"), having the formula (10a):

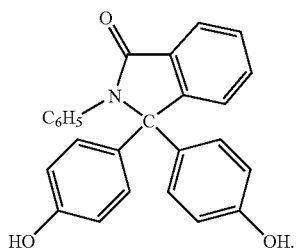

(10a)

In other embodiments, exemplary high heat monomers that are useful herewith include at least one selected from 3,3-bis(4-hydroxyphenyl)phthalimidine phenolphthalein (PPN), 1,1-bis(4-hydroxyphenyl)fluorenone (BCF); 2,2-bis(4-hydroxyphenyl)adamantane; and 1,1-bis(4-hydroxyphenyl)-1-phenyl ethane (BPAP). It will be understood that the foregoing high heat monomers are included as exemplary embodiments, and that the high heat monomers useful herein should not be considered as limited thereto.

Small amounts of other types of diols can be present in the copolycarbonate. For example, a small portion of $R^1$ can be derived from a dihydroxy aromatic compound of formula (11):

(11)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (11) in which the —OH groups are substituted meta to one another, and wherein $R^f$ and u are as described above, are also generally referred to herein as resorcinols. Examples of compounds that can be represented by the formula (11) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

The copolycarbonate further comprises a structural unit derived from a dihydroxy alkylene oxide compound. Specifically, the dihydroxy alkylene oxide compound is a dihydroxy end-capped poly(alkylene oxide) block copolymer comprising at least two structurally different blocks, each having different surface activity properties. In particular, the desired feature for the dihydroxy end-capped poly(alkylene oxide) block copolymer is that it possess a first block which has high hydrophilicity, and a second block having lower hydrophilicity, relative to the first block. Suitable poly(alkylene oxide) block copolymers having this feature and which are useful herein comprise structural units selected from the group consisting of formula (1a) and formula (1b):

$$H\text{-}(E\text{-}X)_l\text{—OH} \quad (1a)$$

$$H\text{-}(E\text{-}X\text{-}E)_l\text{-}OH \quad (1b)$$

wherein E and X are different and each and independently are selected from the group consisting of formula (2a) and formula (2b):

$$\text{—}(OCH_2CH_2)_m\text{—} \quad (2a)$$

$$\text{—}(OCHRCH_2)_n\text{—} \quad (2b)$$

wherein R is a $C_1$-$C_8$ alkyl group, and l, m, and n are integers greater than or equal to 1. In an embodiment, m is 2 to 120; n is 2 to 50; and l is 1 to 3. It will be understood that, where a range of numbers is used that corresponds to the values of m and n, an average value for each of these is intended. In a specific embodiment, the polycarbonate copolymer comprises a dihydroxy alkylene oxide compound of either or both of formulas (1a) or (1b) in which l is 1; i.e., a diblock copolymer is used where l is 1 for formula (1a), and a triblock copolymer where l is 1 for formula (1b). In a specific embodiment, R is methyl.

In an embodiment, for either or both of formulas (1a) or (1b), E corresponds to formula (2a), and X corresponds to formula (2b). Also in an embodiment, m is 2 to 55, specifically 2 to 50, and more specifically 2 to 40; and n is 2 to 50, specifically 3 to 35, and more specifically 3 to 20.

In another embodiment, for either or both of formulas (1a) or (1b), X corresponds to formula (2a), and E corresponds to formula (2b). Also in an embodiment, m is 3 to 120, specifically 4 to 100, and more specifically 5 to 80; and n is 2 to 30, specifically 2 to 25, and more specifically 2 to 20.

In an embodiment, the weight averaged molecular weight (Mw) of the total amount of the structures corresponding to formula (2b) in the copolymer is between 100 and 2,000 g/mol, specifically 200 to 1,500 g/mol, and still more specifically 300 to 1,200 g/mol.

In a specific embodiment, the dihydroxy alkylene oxide compound is a di- or triblock copolymer having ethylene oxide (i.e., 1,2-ethylene oxide) repeating units, also referred to herein as ethylene glycol units, in a first block, and propylene oxide (i.e., 1,2-propylene oxide) repeating units, also referred to herein as propylene glycol units, in a second block. As used herein, a block comprising ethylene oxide units is referred to as a poly(ethylene oxide) block, and may also be referred to as a poly(ethylene glycol) block. Similarly, as used herein, a block comprising propylene oxide units is referred to as a poly(propylene oxide) block, and may also be referred to as a poly(propylene glycol) block. Specifically, in an embodiment, a first block consists essentially of ethylene oxide units, and a second block consists essentially of propylene oxide units. It is contemplated that the first block and/or the second block can itself be a homo- or copolymer comprising either or both of ethylene oxide groups of formula (2a) and propylene oxide groups of formula (2b) (where R is methyl), so long as the desired surface activity properties of the dihydroxy alkylene oxide copolymer, and the polycarbonate copolymer derived therefrom, is maintained. In an exemplary embodiment, useful dihydroxy alkylene oxide compounds include the PLURONIC® (a trademark of BASF Corporation) series of compounds which are block copolymers available from BASF Corporation and having the general block structures PEG-PPG, PEG-PPG-PEG, and PPG-PEG-PPG (the R series) where PEG is poly(ethylene glycol) and PPG is poly(propylene glycol).

Any proportion by weight of the dihydroxy alkylene oxide compound and dihydroxy aromatic compound is contemplated, provided that the desired properties of the resulting polycarbonate copolymer is maintained. In an embodiment, the dihydroxy alkylene oxide compound is present in an amount of 5 to 30 weight percent (wt %), specifically 5 to 20 wt %, more specifically 7 to 15 wt %, based on the total weight of structural units derived from dihydroxy alkylene oxide compound and dihydroxy aromatic compound. Also in an embodiment, structural units derived from the dihydroxy aromatic compound are present in the polycarbonate copolymer in an amount of 70 to 95 wt %, specifically 80 to 95 wt %, and more specifically 85 to 93 wt %, based on the total weight of structural units derived from dihydroxy alkylene oxide compound and dihydroxy aromatic compound. In another embodiment, the dihydroxy aromatic compound comprises a combination of two or more, non-identical dihydroxy aromatic compounds.

In an embodiment, the polycarbonate copolymer comprises structural units derived from a dihydroxy alkylene oxide compound of formulas (1a) or (1b), and at least one dihydroxy aromatic compound of formula (4). In an embodiment, where there are two or more dihydroxy aromatic compounds, the two or more dihydroxy aromatic compounds are all of general formula (4). In another embodiment, the polycarbonate copolymer consists essentially of structural units derived from the dihydroxy alkylene oxide compound, and structural units derived from the dihydroxy aromatic compound. In an embodiment, the polycarbonate copolymer consists essentially of the foregoing proportions of structural units derived from the dihydroxy alkylene oxide compound and dihydroxy aromatic compound where the dihydroxy aromatic compound is a compound of formula (4). Where the polycarbonate copolymer comprises structural units derived from formula (4) (and does not include structural units derived from formula (7)), the Mw of the formula (2b) in the copolymer is between 100 and 2,000 g/mol. In an exemplary embodiment, the polycarbonate copolymer consists of structural units derived from an ethylene oxide-propylene oxide di- or triblock copolymer and structural units derived from bisphenol A.

In another embodiment, the polycarbonate copolymer comprises structural units derived from a dihydroxy alkylene oxide compound of formulas (1a) or (1b), and at least one dihydroxy aromatic compound of formula (7). In an embodiment, where two or more dihydroxy aromatic compounds are used, at least one is of formula (7) and the other is of formula (4). In another embodiment, the polycarbonate copolymer consists essentially of structural units derived from the dihydroxy alkylene oxide compound, and structural units derived from the dihydroxy aromatic compound. In an exemplary embodiment, the polycarbonate copolymer consists of structural units derived from an ethylene oxide-propylene oxide di- or triblock copolymer and structural units derived from PPPBP.

In an embodiment, where the polycarbonate copolymer comprises structural units derived from a high heat monomer of formula (7), the structural units derived from the dihydroxy alkylene oxide compound are present in an amount of 0.1 to 30 wt %, specifically 0.5 to 25 wt %, and more specifically 1 to 20 wt % based on the total weight of structural units derived from dihydroxy alkylene oxide compound, high heat monomer, and any additional dihydroxy aromatic compound not identical to the high heat monomer used.

In an embodiment, the weight average molecular weight of the polycarbonate copolymer is 5,000 to 100,000 g/mol, specifically 7,500 to 75,000 g/mol, and still more specifically 10,000 to 50,000 g/mol, measured using gel permeation chromatography (GPC) on a crosslinked styrene-divinylbenzene column as calibrated to polycarbonate references. GPC samples are prepared in a solvent such as methylene chloride or chloroform at a concentration of about 1 mg/ml, and are eluted at a flow rate of about 0.5-1.5 ml/min.

The polycarbonate copolymer can be substantially transparent. In this case, an article (e.g., a plaque) having a thickness of 3.2 mm and molded from the polycarbonate copolymer can have a haze of less than or equal to about 5%, specifically less than or equal to about 3%, and more specifically less than or equal to about 2%, according to ASTM-D1003-00. Similarly, an article having a thickness of 3.2 mm and molded from the polycarbonate copolymer can have a percent transmittance (% T) of greater than or equal to about 70%, specifically greater than or equal to about 80%, and more specifically greater than or equal to about 90%, according to ASTM-D1003-00.

The polycarbonate copolymers can be manufactured using an interfacial phase transfer process or melt polymerization as is known. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst salt, under controlled pH conditions, e.g. about 8 to about 10. Suitable phase transfer catalysts include compounds of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group.

Exemplary carbonate precursors include, for example, a carbonyl halide such a carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In one embodiment, the process uses phosgene as a carbonate precursor.

The water-immiscible solvent used to provide a biphasic solution includes, for example, methylene chloride, 1,2-dichloroethane, chlorobenzene, toluene, and the like.

Alternatively, melt processes can be used to make the polycarbonate copolymer. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, Banbury® mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing. In addition, exemplary transesterification catalysts may include phase transfer catalysts of formula $(R^3)_4Q^+X$ above, wherein each $R^3$, Q, and X are as defined above Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts.

In an embodiment, where a melt process is used, a thermal stabilizer can be added to the polymerization to mitigate or eliminate any potential degradation of the dihydroxy alkylene oxide compound during the high temperatures (up to about 350° C. or higher) of the melt polymerization. It is known that poly(propylene glycol) polymers are susceptible to thermal degradation, and therefore inclusion of a thermal stabilizer can reduce the degree of decomposition of the dihydroxy alkylene oxide compound and thereby provide a lower level of impurity and lead to higher batch-to-batch consistency in the desired properties of the polycarbonate composition.

The use of a melt process employing an activated carbonate is particularly preferred. As used herein, the term "activated carbonate", also at times referred to as activated diarylcarbonate, is defined as a diarylcarbonate that is more reactive than diphenylcarbonate in transesterification reactions. In an embodiment, the activated carbonate has a formula (12):

wherein Ar is a substituted $C_{6-30}$ aromatic group. In a specific embodiment, the activated carbonates have the formula (13):

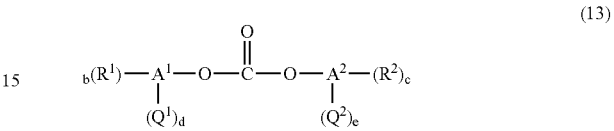

wherein $Q^1$ and $Q^2$ are each independently an activating group present on $A^1$ and $A^2$ respectively, positioned ortho to the carbonate linkage; $A^1$ and $A^2$ are each independently aromatic rings which can be the same or different; "d" and "e" have a value of 0 to a maximum equivalent to the number of replaceable hydrogen groups substituted on the aromatic rings $A^1$ and $A^2$ respectively, and the sum "d+e" is greater than or equal to 1; $R^1$ and $R^2$ are each independently a $C_{1-30}$ aliphatic group, a $C_{3-30}$ cycloaliphatic group, a $C_{5,-30}$ aromatic group, cyano, nitro or halogen; "b" has a value of 0 to a maximum equivalent to the number of replaceable hydrogen atoms on the aromatic ring $A^1$ minus "d"; and "c" is a whole number from 0 to a maximum equivalent to the number of replaceable hydrogen atoms on the aromatic ring $A^2$ minus "e". The number, type and location of the $R^1$ or $R^2$ substituents on the aromatic ring is not limited unless they deactivate the carbonate and lead to a carbonate, which is less reactive than diphenylcarbonate.

Non-limiting examples of suitable activating groups $Q^1$ and $Q^2$ include (alkoxycarbonyl)aryl groups, halogens, nitro groups, amide groups, sulfone groups, sulfoxide groups, or imine groups with structures shown below:

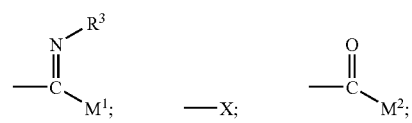

wherein X is halogen or nitro; $M^1$ and $M^2$ independently comprise N-dialkyl, N-alkylaryl, an aliphatic functionality or an aromatic functionality; and $R^3$ is an aliphatic functionality or an aromatic functionality.

Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures where the type and number of substitutions on $A^1$ and $A^2$ are different can also be used as the carbonate precursor. In an embodiment, the activated carbonate is an ester-substituted diarylcarbonate having the formula (14):

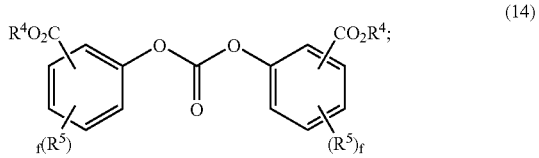

(14)

wherein $R^4$ is independently at each occurrence a $C_{1-20}$ aliphatic group, a $C_{4-20}$ cycloaliphatic group, or a $C_{4-20}$ aromatic group, $R^5$ is independently at each occurrence a halogen atom, cyano group, nitro group, a $C_{1-20}$ aliphatic group, a $C_{4-20}$ cycloaliphatic group, or a $C_{4-20}$ aromatic group and f is independently at each occurrence an integer having a value of 0 to 4. In one embodiment, at least one of the substituents —$CO_2R^4$ is attached in an ortho position of formula (14).

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one embodiment, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl) butylphenyl)carbonate and bis(o-cyanophenyl)carbonate. Unsymmetrical combinations of these structures may also be used as non-activated carbonates.

An end-capping agent (also referred to as a chain-stopper) can be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Endgroups can derive from the carbonyl source as well as any added end-capping groups. Thus, in an embodiment, a polycarbonate can comprise a structural unit derived from the carbonyl source. In a further embodiment, the carbonyl source is derived from an activated or non-activated carbonate. In a specific embodiment, where BMSC is used as the carbonyl source, the endgroup is derived from BMSC.

Suitable monocarboxylic acid chlorides include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are monochloroformates including monocyclic monochloroformates, such as phenyl chloroformate, $C_1$-$C_{22}$ alkyl-substituted phenyl chloroformate, p-cumyl phenyl chloroformate, toluene chloroformate, and combinations thereof.

Various types of polycarbonates with branching groups are contemplated as being useful, provided that such branching does not significantly adversely affect desired properties of the compositions. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

For certain applications, a permanently hydrophilic polycarbonate surface is important where the ability of water to wet a surface is critical. Such applications include, for example, filters and membranes where a hydrophilic surface is needed to prevent air bubbles and to improve flow through a membrane. Copolycarbonates having poly(ethylene glycol) blocks, which have a high hydrophilicity relative to homopolycarbonates, are known to increase the hydrophilicity of a polycarbonate. Increasing amounts of PEG can lead to increased hydrophilicity, as measured by water contact angle. However, inclusion of PEG blocks within polycarbonates, which have relatively high miscibility, has been found to adversely affect other desired properties of the polycarbonate when the PEG is present in amounts effective to provide a hydrophilic surface, such as the glass transition temperature (Tg) of the resulting PEG-polycarbonate copolymer, which can be significantly reduced in glass transition temperature relative to an unmodified polycarbonate of the same composition but without PEG. The decrease in Tg can lead to undesired shape distortion of articles prepared using such copolymers during high heat operations (such as autoclaving to sterilize the article).

The hydrophilicity of a surface can be measured by the contact angle of a sessile drop of contaminant-free water placed on the surface, and measuring the tangential angle of contact between the drop and the surface. For polycarbonate, the contact angle is typically about 80° or greater indicating a relatively low wettability for a polymeric substrate. For a surface of an article made from polycarbonate, surfaces with greater hydrophilicity (i.e., lower contact angle) have improved wettability.

Surprisingly, it has been found that polycarbonate copolymers containing a surface-active block (e.g., poly(propylene glycol), PPG) immediately adjacent to the poly(ethylene glycol) (PEG) block, have increased hydrophilicity at lower loadings of the PEG. While not wishing to be bound by theory, it is believed the surface-active block helps convey the poly(ethylene glycol) to the surface, thereby also increasing the surface availability of the hydrophilic PEG block. The advantage of this type of construction is that poly(ethylene glycol) tends to be miscible with polycarbonate and is not surface-active; however, with the surface-active block next to the poly(ethylene glycol) block, the resulting surface has a lower contact angle indicating increased hydrophilicity at the surface.

These copolymers can have other advantageous properties as well, such as improved transparency, and improved compatibility (wettability) with biological fluids, particularly blood and blood products (i.e., hemocompatibility). For hydrophilic surfaces, there is less retention (by adhesion) of blood components that are passed over a hydrophilic surface, particularly, there is less retention by adhesion of cells such as platelets, proteins, and other such components relative to the amount retained at the surface of a homopolycarbonate such as bisphenol A polycarbonate. In an exemplary embodiment, lower platelet adhesion indicates an improvement in hemocompatibility. Thus, an article molded from the polycarbonate composition has a % platelet adhesion that is lower than that of a comparative article molded from a typical polycarbonate, such as for example bisphenol A polycarbonate.

Additionally, copolymers and terpolymers using high heat monomers (such as PPPBP) are also provided. It has been found that introduction of an amount of a high heat monomer into a PEG-PPG/bisphenol A copolymer can effectively increase the glass transition temperature of the resulting terpolymer, and may in this way be used as a compositional adjustment to target a specific surface hydrophilicity. In an exemplary embodiment of a terpolymer, a BPA/PPPBP/PLURONIC® terpolymer can be made with a glass transition temperature comparable to that of the Tg of bisphenol A polycarbonate homopolymer.

In an embodiment, the surface contact angle of an article molded from the polycarbonate copolymer is less than or equal to 70°, specifically less than or equal to 68°, and more specifically less than or equal to 65°, where the surface contact angle is measured using a sessile water drop measurement technique.

In an embodiment, an article molded from the polycarbonate copolymer has a % platelet adhesion of less than 19%, specifically less than or equal to 15%, and still more specifically less than or equal to 10%, of that of a comparative article molded from bisphenol A polycarbonate.

The polycarbonate copolymer can be combined with other components to provide a thermoplastic composition, where types and amounts of the other components are present such that the desired properties of the thermoplastic composition are not significantly adversely affected by these other components. In an embodiment, the thermoplastic composition consists essentially of the polycarbonate composition.

Any additives, including additional polymers, are contemplated provided they do not significantly adversely affect the desired properties of the polycarbonate copolymer. In this way, combinations of the polycarbonate copolymer with other thermoplastic polymers are contemplated, for example combinations with homopolycarbonates, other polycarbonate copolymers comprising different $R^1$ moieties in the carbonate units, polyester carbonates, also known as polyester-polycarbonates, and polyesters, polysiloxane-polycarbonates, or combination of these, provided the additional polymer is not identical to the polycarbonate copolymer disclosed herein. When used, the additional polymer can be present in the thermoplastic composition in an amount of 1 to 30 wt %, specifically 1 to 20 wt %, more specifically 2 to 15 wt %, based on the total weight of polycarbonate copolymer, and the additional polymer. In an embodiment, the thermoplastic composition consists essentially of the polycarbonate, and any additional polymer. In an exemplary embodiment, an additional polymer can be a linear homopolycarbonate polymer derived from bisphenol A.

In addition to the polycarbonate copolymer and any additional polymer, the thermoplastic composition can further comprise additives, provided that any additives included in the thermoplastic composition do not significantly adversely affect the desired properties of the thermoplastic composition.

For example, the thermoplastic composition can further include impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than about 10° C., more specifically less than about −10° C., or more specifically about −40° C. to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 parts by weight, based on 100 parts by weight of polycarbonate copolymer and any additional polymer.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 20 parts by weight, as on 100 parts by weight of polycarbonate copolymer and any additional polymer.

Exemplary antioxidant additives include, for example, organophosphites such as tris(nonyl phenyl)phosphite, tris(2, 4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 0.1 parts by weight, based on 100 parts by weight of polycarbonate copolymer and any additional polymer.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 0.1 parts by weight, based on 100 parts by weight of polycarbonate copolymer and any additional polymer.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 5 parts by weight, based on 100 parts by weight of polycarbonate copolymer and any additional polymer.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with a particle size less than or equal to about 100 nanometers; or the like, or combinations comprising at least one of the foregoing UV absorbers. UV absorbers are generally used in amounts of about 0.01 to about 5 parts by weight, based on 100 parts by weight of polycarbonate copolymer and any additional polymer.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g. methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of about 0.1 to about 1 part by weight, based on 100 parts by weight of polycarbonate copolymer and any additional polymer.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 antistatic (Sanyo) or PEBAX® MH1657 antistatic (Atofina), IRGASTAT® P18 and P22 antistatics (Ciba-Geigy). Other polymeric materials that can be used as antistatic agents are inherently conducting polymers such as polyaniline (commercially available as PANIPOL® EB polymer (from Panipol), polypyrrole and polythiophene (commercially available from Bayer), which retain some of their intrinsic conductivity after melt processing at elevated temperatures. Specifically useful antistatic agents include tetraalkyl-onium salts of perfluoroalkane sulfonates, such as for example the tetrabutylphosphonium salt of perfluorobutanesulfonate. These and others are described in U.S. Reexamined Pat. No. RE38530. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of about 0.05 to about 0.5 parts by weight, based on 100 parts by weight of polycarbonate copolymer and any additional polymer.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of about 0.0001 to about 10 parts by weight, based on 100 parts by weight of polycarbonate copolymer and any additional polymer.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes, anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of about 0.0001 to about 5 parts by weight, based on 100 parts by weight of polycarbonate copolymer and any additional polymer.

Where a foam is desired, useful blowing agents include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of about 1 to about 20 parts by weight, based on 100 parts by weight of polycarbonate copolymer and any additional polymer.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl)phosphate, phenyl bis(3,5, 5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

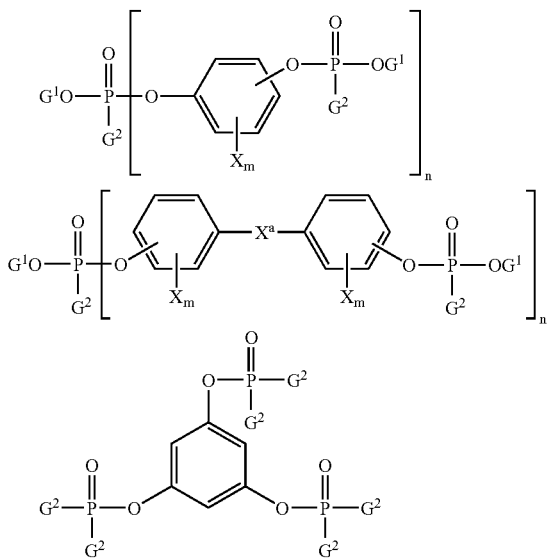

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of about 0.1 to about 30 parts by weight, more specifically about 1 to about 20 parts by weight, based on 100 parts by weight of polycarbonate copolymer and any additional polymer.

Halogenated materials can also be used as flame retardants, for example halogenated compounds and resins of formula (15):

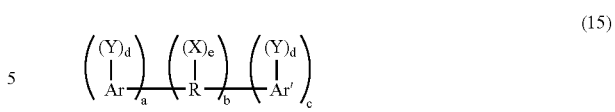

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (15) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane, bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of about 1 to about 25 parts by weight, more specifically about 2 to about 20 parts by weight, based on 100 parts by weight of polycarbonate copolymer and any additional polymer.

Alternatively, the thermoplastic composition can be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of the composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 10 parts by weight, more specifically about 0.02 to about 1 parts by weight, based on 100 parts by weight of polycarbonate copolymer and any additional polymer.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. Antidrip agents are generally used in amounts of 0.1 to 10 percent by weight, based on 100 percent by weight of polycarbonate copolymer and any additional polymer.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexanediol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-di-methyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—$CH_2OH$) or it can be a member of a more complex hydrocarbon group such as —$CR^4HOH$ or —$CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are used herein in amounts of 5 to 10 parts by weight based on 100 parts by weight of polycarbonate copolymer and any additional polymer.

The thermoplastic composition prepared from the polycarbonate copolymer can further be substantially transparent, having a low haze. Thus, a 3.2 mm thick plaque molded from the thermoplastic composition desirably has a haze of less than about 25%, specifically less than about 20%, more specifically less than about 10%, and still more specifically less than about 5%, as measured using 3.2 mm thick plaques according to ASTM-D1003-00. Similarly, a 3.2 mm thick plaque molded from the thermoplastic composition desirably has a % T of greater than or equal to about 70%, specifically greater than or equal to about 75%, more specifically greater than or equal to about 80%, and still more specifically greater than or equal to about 85%, according to ASTM-D1003-00.

Thermoplastic compositions comprising the copolycarbonate can be manufactured by various methods. For example, powdered copolycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be onefourth inch long or less as desired. Such pellets can be used for subsequent molding, shaping, or forming.

Shaped, formed, or molded articles comprising the copolycarbonate compositions are also provided. The polycarbonate compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In addition, the polycarbonate compositions can be used for medical applications, such as syringe barrels, sample containers, medicament containers, plastic vials, blood housings, filter housings, membrane housings, plungers, and the like.

In an embodiment, the polycarbonate composition can be cast from a suitable solvent to prepare supported membranes that can be used to fabricate filters or separators of blood products.

EXAMPLES

The copolycarbonates are further illustrated by the following non-limiting examples.

Molecular weight was determined using gel permeation chromatography, and a crosslinked styrene-divinylbenzene column operating at a flow rate of 0.5-1.0 ml/min, a sample concentration of 1 mg/ml, and calibrated using polystyrene standards.

Surface contact angle measurements were performed using a Krüss Drop Shape Analysis System DSA10, depositing Milli-Q® purified water (as purified using the purification system obtained from Millipore Corp.) as a fluid probe to form the sessile drop. Using the sessile drop method, a drop of water is automatically deposited on the surface or substrate to be tested, and the contact angle (θ) between the surface and the 3 phase tangent line emanating from a point at the junction of the three phases, i.e., the surface, the water drop, and the air, is measured by the system automatically. In performing the measurement, the system deposits a 1.5 µl drop of water onto the specimen surface and measurements are taken every 0.2 seconds for a period of 10 seconds by a CCD-camera. From the live video image captured, the system automatically measures the contact angle as the angle between the substrate and the tangent of the water drop surface at the 3 phase contact line that the water drop makes with the surface of the specimen, and the data are analyzed by Drop Shape Analysis software (DSA version 1.7, Krüss). The complete profile of the droplet was fitted by the tangent method to a general conic section equation. The angles were determined both at the right and left side. An average value is calculated for each drop and a total of five drops per sample are measured. The average of the five drops is taken as the contact angle.

Glass transition temperature was determined by differential scanning calorimetry using a Perkin Elmer Series 7 temperature ramp of 20° C./min. The samples were cycled through two successive temperature ramps and the glass transition temperature (Tg) was determined from the second ramp.

Haze (%) and transmittance (% T) was determined according to ASTM D1003-00 using a Gardner Haze Guard Dual, on 3.2 millimeter thick molded plaques.

The relative platelet adhesion was determined by exposing injection molded parts in the form of microwell strips to a standardized amount of platelet rich plasma (PRP) obtained from a pooled blood source. The exposure time was two hours at 37° C. The parts were then rinsed to remove non-adhering platelets, and the platelets remaining on the surface were lysed with Triton® X-100 solution to release lactate dehydrogenase (LDH). The LDH released is a linear function of the platelet count. The LDH concentration is determined with a commercially available LDH cytotoxicity kit that uses a calorimetric measurement (Cytotoxicity Detection Kit (LDH) available from Roche Applied Science; Catalog No. 11 644 793 001). All platelet adhesion values are reported as a percentage of the value for a BPA polycarbonate standard that is measured concurrently with other test materials. Thus, a material whose reported value for platelet adhesion is 20% has ⅕ the number of platelets adhering to it as the BPA polycarbonate standard for the exposures used in the above protocol.

Copolycarbonates containing BPA and a PEG-PPG block copolymer provided as a PLURONIC® PEG-PPG copolymer (BASF) were made using a transesterification reaction of BPA and PLURONIC® PEG-PPG copolymer with bis(methyl-salicyl)carbonate according to the following general method.

Where a melt process was used, melt trans-esterification reactions were carried out in a small or large-scale batch reactor and were run according to the following protocols. Residual sodium was cleaned from the glass reactor by soaking in 1 M HCl for at least 24 hours followed by rinsing at least 5 times with 18.2 milliohm deionized water. The temperature of the reactor was maintained using a heating mantle with a temperature controller and thermocouple. The pressure over the reactor was controlled by a nitrogen bleed into a vacuum pump downstream of the distillate collection flasks and measured with a pressure gauge. Catalyst solutions were prepared by diluting tetramethyl ammonium hydroxide (TMAH) (Sachem, 25 wt % in water) and NaOH (Acros, 0.5 M) to the proper concentrations with 18.2 milliohm water. All reactions where carried out with $2.5 \times 10^{-5}$ mol of TMAH/ total moles dihydroxy compounds, which was added in 100 microliter increments together with the NaOH. In the reaction, 1 eq. of NaOH was equal to $1.0 \times 10^{-6}$ mol of NaOH/total moles dihydroxy compounds. Reactions were carried out in the presence of 1 to 10 eq of NaOH. The total amount of added catalyst solution is maintained at 100 microliter. Where higher levels of catalyst were needed, new solutions were prepared. The glass reactor tube was charged with the solid bisphenols (0.05879 to 0.05995 mol) and solid bis(methylsalicyl)carbonate (BMSC) (0.0605 mol), depending on the targeted molar ratio of bisphenols to BMSC (1.03:1 to 1.01:1, respectively). The reactor was then assembled, sealed and the atmosphere was exchanged with nitrogen three times. The catalyst was added to the monomers. The reactor was brought to near atmospheric pressure and reaction time started at the same moment the heaters were set to the first set point.

The general reaction profile for a small (ca. 25 gram) scale melt-process reaction is as follows. The reaction profile started with melting the combined dihydroxy compounds, BMSC, and catalysts at 200° C. (170° C. if no high heat monomer is used), 1,000 millibars pressure and heating of the overhead to 100° C. After 6 minutes the stirrers were switched on (40 rpm). After 15 minutes, the pressure was reduced to 500 millibars. After 45 minutes, the temperatures of the heaters were ramped up to 270° C. Then, at 50 minutes, the heaters were set to 300° C., and at the same time, the pressure was slowly reduced to achieve full vacuum (i.e., about 0.5 to 1 millibars). The time needed to reach full vacuum depended on the behavior of the oligomer, typically approximately 4 minutes. When 64 minutes of reaction time was reached the polymerization was stopped.

After completion of the polymerization, the reactor was brought back to atmospheric pressure with a gentle nitrogen flow. When atmospheric pressure was reached, stirring was stopped and the resulting material drained from the reactor tubes by opening a valve at the bottom of the reactor pushing out the material under a slight nitrogen over-pressure. The recovered material was then analyzed.

For melt experiments conducted with a non-activated carbonate, the same setup and procedure was used as for the small scale but diphenyl carbonate was used instead of bis (methylsalicyl)carbonate (BMSC). The glass reactor tube was charged with the solid monomers (0.087 mol) and solid diphenyl carbonate (0.09 mol). The reaction profile started with melting of the reactants at 180° C. and 1,000 millibars pressure, and the overhead was heated to 100° C. After 6 minutes the stirrers were switched on (40 rpm). After 10 minutes, the temperature was increased to 230° C. After 15 min, the pressure was reduced to 270 millibars. After 70 minutes the pressure was reduced to 20 millibars. After 98 min, the temperature was increased to 250° C. After 108 min, the pressure was reduced to 0.5 to 1 millibars. For the experiment performed at 270° C., after 115 min., the temperature was increased to 270° C. After 150 min, the reaction was stopped.

The general reaction profile for a large (ca. 8-10 kilogram) scale melt-process reaction is as follows. A 50 liter stir tank was charged with BMSC (8.68 Kg, 26.3 moles), bisphenol-A (5.0 Kg, 21.9 moles), PPP-BP (1.51 Kg, 3.87 moles), PEG-PPG copolymer (e.g., PLURONIC® L61 copolymer; 1.15 Kg, 0.606 moles), and p-cumyl phenol (0.11 Kg, 0.526 moles) at room temperature. Two catalyst solutions were added: tetramethyl ammonium hydroxide (25 wt % aqueous solution, 0.50 ml), and sodium hydroxide (0.10M aqueous solution, 2.0 ml). The reactor was sealed, and purged with nitrogen three times to deoxygenate the atmosphere in the reactor. The mixture was then heated to 180° C. for at least one hour. The resulting molten mixture was transferred by pumping into a 25 mm twin screw extruder at a rate of 8.0 Kg/hr. The extruder barrel set temperatures were each 280° C. at a screw speed of 250-300 rpm. The extruder was equipped with vacuum ports sufficient to effect efficient removal of methyl salicylate by-product. The high molecular weight polymer prepared in this way had residual methyl salicylate levels of less than 500 ppm.

A series of polycarbonate copolymers were prepared to evaluate the inclusion of PEG-PPG copolymers into the polycarbonate backbone. Block copolymers of PEG and PPG commercialized by BASF under the tradename PLURONIC® PEG-PPG copolymers were used. In these PEG-PPG copolymers, PEG (poly(ethylene glycol) is a hydrophilic block, and PPG (poly(propylene glycol)) is the surface active component of the PEG-PPG copolymer. Two different varieties of these PEG-PPG copolymers are available, as PLURONIC® (having a PEG-PPG-PEG) structure) and PLURONIC® R (having a PPG-PEG-PPG structure) PEG-PPG copolymers, as shown in (I) and (II) below, respectively. In (I) and (II), x, y, and z are each integers, which are be varied to provide the desired weight percentages of PEG and PEG and weight averaged molecular weight (Mw) in the PEG-PPG copolymers I and II as evaluated.

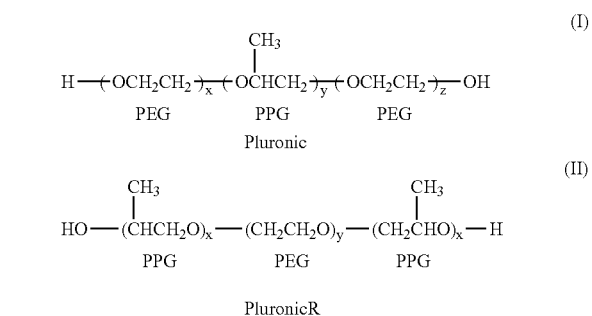

Table 1 shows the effect of the synthesis method on molecular weight buildup for copolycarbonates, where use of activated carbonate is shown to provide higher Mw than use of non-activated carbonate.

TABLE 1

| Example | Weight % PLURONIC ® 10R5 | Synthesis Method | Mw (g/mol) |
|---|---|---|---|
| Ex. 1 | 15 | Melt AC* | 42,000 |
| Ex. 2 (repeat of Ex. 1) | 15 | Melt NAC* | 36,000 |

*AC using activated carbonate, bis(methylsalicyl)carbonate; NAC using non activated carbonate (DPC)

A variety of copolycarbonates containing PLURONIC® PEG-PPG copolymers were made using the transesterification process mentioned above, and the samples were compression molded into bars at 190° C. for contact angle measurements (Table 2).

Table 2 shows the effect of PLURONIC® PEG-PPG copolymer concentration on the contact angle. As a control, the copolycarbonate comparative example prepared using polyethylene glycol (CEx. 2) has the same wt % of polyethylene glycol as PLURONIC® 10R5 PEG-PPG copolymer (Ex. 3) and PLURONIC® L35 PEG-PPG copolymer (Ex. 4).

TABLE 2

| Example | PEG-PPG copolymer Co-monomer | Wt % in Copolymer | Wt % PEG in Copolymer | Contact Angle (°) |
|---|---|---|---|---|
| 3 | PLURONIC ® 10R5 | 15 | 7.5 | 65 ± 3 |
| 4 | PLURONIC ® L35 | 15 | 7.5 | 60 ± 5 |
| CEx. 2 | Polyethylene Glycol (Mw = 300 g/mole) | 7.5 | 7.5 | 78 ± 2 |

Table 2 shows that, for a constant amount of poly(ethylene glycol) in a copolycarbonate, the use of a PLURONIC® PEG-PPG copolymer produces a much lower contact angle than the poly(ethylene glycol) containing comparative example (CEx. 2). PLURONIC® PEG-PPG copolymers contain poly(propylene oxide) as the surface-active block, and as poly(propylene oxide) is known to be more hydrophobic than polyethylene glycol. It is believed that the reduction in contact angle is achieved mostly through the poly(ethylene glycol). Therefore, a more hydrophilic surface is found when a PLURONIC® PEG-PPG copolymer instead of poly(ethylene glycol) is used as a co-monomer.

From the results obtained and as provided in Table 2, it was determined that the decrease in contact angle by addition of hydrophilic monomer to the composition is not obvious. Without wishing to be bound by theory, it can be concluded that for copolycarbonates prepared using a PEG-PPG diblock copolymer, the presence of a surface active group component (PPG) appears to bring the hydrophilic (PEG) groups to the polymer surface, providing the PEG blocks with surface access and thereby decreasing the surface contact angle. In addition, the use of a block copolymer of the hydrophilic component (PEG) and the surface-active component (PPG) works better than the random incorporation of both components into the polymer chain.

Table 3 shows the static water contact angle, Tg, and platelet adhesion results for additional examples of polycarbonate copolymers made with PEG and PEG-PPG block copolymers. The contact angle and Tg results were obtained using molded plaques, whereas the platelet adhesion results were obtained from molded polymer samples as described above.

Table 4 shows the effect of static water contact angle for different loadings of PLURONIC® 10R5 copolymerized with BPA and PPPBP in different molar ratios. (PLURONIC® 10R5 is a PEG-PPG block copolymer from BASF Corporation having the structure PPG-PEG-PPG). In addition, FIG. 1 shows a plot of loading of PLURONIC® 10R5 versus static water contact angle.

TABLE 4

| Example | BPA (mol %)[c] | PPPBP (mol %)[c] | PLURONIC ® 10R5 (wt %) | Static Water Contact Angle (°) |
|---|---|---|---|---|
| Ex. 10 | 55 | 45 | 20 | 61 |
| Ex. 11 | 65 | 35 | 15 | 60 |
| Ex. 12 | 73 | 27 | 10 | 68 |

TABLE 3

| Example | Composition (mol %) | % wt glycol monomer in polymer | Static Water Contact Angle (°) | Tg (° C.) | Platelet Adhesion (% v. BPA-PC) |
|---|---|---|---|---|---|
| CEx. 3 | 100% BPA | 0 | 83 | 152 | 100 |
| CEx. 4 | 70% BPA, 30% PPPBP | 0 | 86 | 200 | 79 |
| CEx. 5 | 57.7% BPA, 31.4% PPPBP, 10.9% PEG400[b] | 14 | 81 | 121 | 53 |
| CEx. 6 | 63.2% BPA, 34.3% PPPBP, 2.5% PEG2000[b] | 14 | 66 | 125 | 33 |
| CEx. 7 | 74% BPA, 21.5% PPPBP, 2.7% PPG1000[b] | 9 | 72 | 138 | 32 |
| CEx. 8 | 59.8% BPA, 32.5% PPPBP, 3.7% PEG600, 2.2% PPG1000[b] | 13 | 70 | 133 | 19 |
| Ex. 5 | 97.7% BPA, 2.3% PLURONIC ® L35[a] | 15 | 63 | 97 | — |
| Ex. 6 | 62.0% BPA, 33.3% PPPBP, 2.5% PLURONIC ® L35[a] | 14 | 65 | 126 | 5 |
| Ex. 7 | 63.2% BPA, 34.3% PPPBP, 2.5% PLURONIC ® L61[a] | 14 | 67 | 127 | 4 |
| Ex. 8 | 81.5% BPA, 14.4% PPPBP, 2.1% PLURONIC ® L61[a] | 14 | 66 | 110 | 5 |
| Ex. 9 | 71.8% BPA, 23.9% PPPBP, 4.3% PLURONIC ® L61[a] | 23 | 67 | 84 | 3 |

[a]PLURONIC ® L35 and L61 are PEG-PPG block copolymers from BASF Corporation having the structure PEG-PPG-PEG.
[b]PEG400, PEG600, and PEG2000 are polyethylene glycols with nominal molecular weights of 400, 600, and 2000, respectively. PPG1000 is a polypropylene glycol with a nominal molecular weight of 1000.

In Table 3, it can be seen that there is a distinct difference in surface contact angle between copolycarbonates prepared using single blocks of PEG (CEx. 5, 6, and 8) or PPG (CEx. 7) and copolycarbonates prepared using PEG-PPG block copolymers (Ex. 5-9). PLURONIC® L61 in particular provides low contact angle even where the amount of the BPA component is high relative to PPPBP (Ex. 8), even when compared to a similar molar amount of PLURONIC® L35 with higher PPPBP (Ex. 6); however, the Tg for Ex. 8 is also reduced versus Ex. 6, a function of the higher PPPBP loading in the latter polymer.

In addition, there is a dramatic decrease seen in platelet adhesion versus bisphenol A polycarbonate for the copolycarbonates prepared using PLURONIC® PEG-PPG copolymers (Exs. 6-9), as compared to the copolycarbonates prepared using no hydrophilic or hydrophobic blocks (PEG, PPG, or a combination; CExs. 3-8). The platelet adhesion values for the examples are all in the single digits, well below that of the comparative examples.

Increasing the amount of PLURONIC® PEG-PPG copolymer in the composition provided a decrease in contact angle.

TABLE 4-continued

| Example | BPA (mol %)[c] | PPPBP (mol %)[c] | PLURONIC ® 10R5 (wt %) | Static Water Contact Angle (°) |
|---|---|---|---|---|
| Ex. 13 | 83 | 17 | 5 | 70 |
| CEx. 9 | 65 | 35 | 0 | 78 |

[c]Mole percentages of BPA and PPPBP are based on the combined no. of moles of BPA and PPPBP.

As seen in the data in Table 4, and in FIG. 1, the water contact angle increases with increasing amounts of BPA and PLURONIC® 10R5 (and decreasing levels of PPPBP). The static water contact angle reaches a plateau at values of 68 to 70° at PLURONIC® 10R5 component levels of 5 to 10 wt %, and BPA levels (relative to BPA+PPPBP in the copolycarbonates) of 73 to 83 mol % (Exs. 12 and 13). At a composition of 20 wt % hydrophilic monomer, the contact angle reaches a minimum level (Ex. 10).

By increasing the molecular weight of PPG in the PLURONIC® polymer, haze increases and % transmission decreases. In the studied range, these properties show no correlation with the Mw of PEG in the PLURONIC® polymer. Table 5 shows the percent haze and transmission of PEG-PPG/BPA/PPPBP terpolymer plaques versus molecular weight of PPG in the PEG-PPG block copolymer. All compositions presented in the table have 35 mol % PPPBP and 65 mol % BPA. The data are plotted as molecular weight of PPG versus haze in FIG. 2, and versus % T in FIG. 3.

TABLE 5

| Example | Hydrophilic monomer | Hydrophilic monomer (wt %) | Mw PPG (g/mol) | Mw PEG (g/mol) | Haze (%) | Transmission (%) |
|---|---|---|---|---|---|---|
| Ex. 14 | PLURONIC ® L35 | 13 | 950 | 950 | 1.93 | 78.2 |
| Ex. 15 | PLURONIC ® L35 | 14 | 950 | 950 | 1.92 | 76.3 |
| CEx. 10 | PLURONIC ® P85 | 15 | 2300 | 2300 | 43.5 | 70.7 |
| Ex. 16 | PLURONIC ® L61 | 15 | 1800 | 200 | 2.16 | 83.9 |
| CEx. 11 | PLURONIC ® 31R1 | 15 | 2925 | 325 | 102 | 18.1 |
| Ex. 17 | PLURONIC ® 17R2 | 15 | 1720 | 430 | 2.78 | 83.2 |
| CEx. 12 | PLURONIC ® 25R2 | 15 | 2480 | 620 | 93.7 | 28.5 |
| Ex. 18 | PLURONIC ® 10R5 | 15 | 1000 | 960 | 1.86 | 82.8 |

Figure 2:
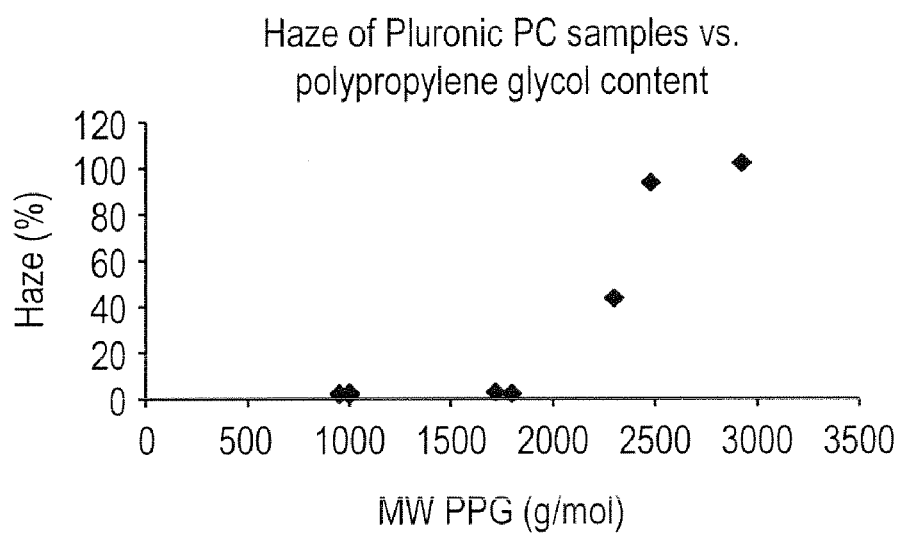
FIG. 2 is a plot of haze versus Mw of PPG for exemplary PEG/PPG polycarbonate copolymers.

As seen in Table 5, copolymers prepared using PLURONIC® L35 (Exs. 14 and 15), PLURONIC® L61 (Ex. 16), PLURONIC® 17 (Ex. 17), and PLURONIC® 10R5 (Ex. 18) PEG-PPG copolymers provided acceptable values for both haze and transmission. The length of the PPG chain appears to affect optical properties, as shown in FIGS. 2 and 3. At an Mw of 1,800 g/mol or less for the PPG block (Ex. 16), no increase in haze (See FIG. 2) or reduction in % T (See FIG. 3) is apparent.

Table 6 shows the effect of different "high heat" monomers on the Tg of copolycarbonates prepared using a high heat monomer, BPA, and PLURONIC® L35. The particular high heat ("HH") monomers evaluated include PPPBP, TCDBP, BPI, and phenolphthalein (abbreviated "PPN" in Table 6). The results are as shown below.

greatest increase per unit HH monomer loading was observed for PPPBP.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or can not occur, and that the description includes instances where the event occurs and instances where it does not. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example —CHO is attached through carbon of the carbonyl group. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the

TABLE 6

| Example | HH monomer | % mol BPA | % mol HH monomer | mol % PLURONIC ® L35 PEG-PPG copolymer | % wt glycol monomer in polymer | Tg (° C.) | Mw (g/mol) |
|---|---|---|---|---|---|---|---|
| Ex. 19 | none | 97.9 | 0.0 | 2.1 | 15.2 | 79 | 42027 |
| CEx. 13 | PPPBP | 65 | 35 | 0 | 0 | 196 | 29802 |
| Ex. 20 | PPPBP | 63.6 | 33.7 | 2.7 | 15.4 | 122 | 40748 |
| CEx. 14 | PPN | 65.5 | 34.5 | 0.0 | 0 | 195 | 56541 |
| Ex. 21 | PPN | 63.5 | 33.6 | 2.9 | 18.0 | 106 | 94624 |
| CEx. 15 | TCDBP | 65.1 | 34.9 | 0.0 | 0 | 193 | 42027 |
| Ex. 22 | TCDBP | 63.6 | 33.5 | 2.9 | 17.9 | 108 | N/A |
| CEx. 16 | BPI | 64.9 | 35.1 | 0 | 0 | 165 | 68268 |
| Ex. 23 | BPI | 62.8 | 34.2 | 3.1 | 22.0 | 87 | 30298 |

<sup>a</sup>Mole percentages of BPA and HH monomer are based on the combined no. of moles of BPA and PPPBP.

As seen in Table 6, increases in Tg were observed versus the BPA-PLURONIC® L35 copolymer for all high heat monomers used. The lowest Tg (87° C.) was observed for BPI, which also had a slightly higher PEG-PPG copolymer loading (3.1 mol % versus 2.7 mol % for Ex. 20 and 2.9 mol % for Exs. 21 and 22). The highest Tg (122° C.) and hence the term "combination" is inclusive of blends, mixtures, alloys, reaction products, and the like.

As used herein, the term "hydrocarbyl" refers broadly to a substituent comprising carbon and hydrogen, optional with at least one heteroatoms, for example, oxygen, nitrogen, halogen, or sulfur; the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "cycloalkyl" refers to a non-aromatic monovalent monocyclic or multicyclic hydrocarbon group having at least three carbon atoms; "cycloalkylene" refers to a non-aromatic divalent monocyclic or multicyclic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

An "organic group" as used herein means a saturated or unsaturated (including aromatic) hydrocarbon having a total of the indicated number of carbon atoms and that can be unsubstituted or unsubstituted with one or more of halogen, nitrogen, sulfur, or oxygen, provided that such substituents do not significantly adversely affect the desired properties of the composition; for example transparency; heat resistance, or the like. Exemplary substituents include alkyl alkenyl, alkynyl, cycloalkyl, aryl, alkylaryl, arylalkyl, —NO$_2$, SH, —CN, OH, halogen, alkoxy, aryloxy, acyl, alkoxy carbonyl, and amide groups.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate copolymer, comprising:

A) a structural unit derived from a dihydroxy alkylene oxide compound selected from the group consisting of formula (1a) and formula (1b):

H-(E-X)$_l$—OH  (1a)

H-(E-X-E)$_l$-OH  (1b)

wherein E and X are different and each and independently are selected from the group consisting of formula (2a) and formula (2b):

—(OCH$_2$CH$_2$)$_m$—  (2a)

—(OCHRCH$_2$)$_n$—  (2b)

wherein R is a C$_1$-C$_8$ alkyl group; l, m, and n are integers greater than or equal to 1; and B) a structural unit derived from a high-heat monomer comprising a dihydroxy aromatic compound of formula (7):

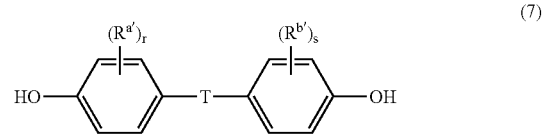

(7)

wherein R$^{a'}$ and R$^{b'}$ are each independently C$_{1-12}$ alkyl, T is a C$_{5-16}$ cylcloalkylidene or C$_{6-16}$ heterocycloarylene having up to three heteroatoms in the ring, wherein T is connected to at least one atom of each aromatic ring in the dihydroxy aromatic compound, wherein the heteroatoms include —O—, —S—, or N(Z)-, and Z is hydrogen, halogen, hydroxy, C$_{1-12}$ alkyl, C$_{1-12}$ alkoxy, C$_{6-12}$ aryl, or C$_{1-12}$ acyl, and wherein r and s are each independently 0 to 4, wherein an article with a thickness of 3.2 mm and molded from the polycarbonate copolymer has a haze of less than or equal to 5% according to ASTM D1003-00.

2. The polycarbonate copolymer of claim 1, wherein the dihydroxy aromatic compound is a C$_6$ cycloalkylidene-bridged bisphenol of formula (8):

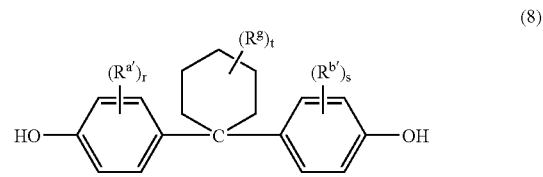

(8)

wherein R$^{a'}$ and R$^{b'}$ are each independently C$_{1-12}$ alkyl, R$^g$ is C$_{1-12}$ alkyl or halogen, r and s are each independently 0 to 4, and t is 0 to 3, wherein when either or both of r and s are greater than 0, at least one of each of R$^{a'}$ and R$^{b'}$ is disposed meta to the cyclohexylidene bridging group.

3. The polycarbonate copolymer of claim 2, wherein the dihydroxy aromatic compound has the formula (8b):

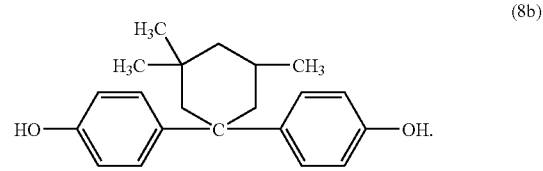

(8b)

4. The polycarbonate copolymer of claim 2, wherein the dihydroxy aromatic compound has the formula (8c):

(8c)

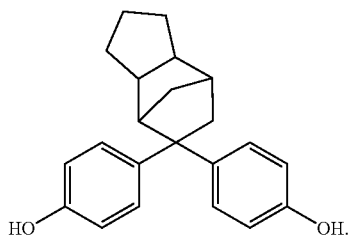

5. The polycarbonate copolymer of claim 1, wherein in the dihydroxy aromatic compound, T is a substituted $C_{5-8}$ heterocycloalkylidene of the formula (6):

(6)

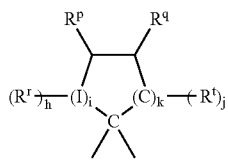

wherein each $R^r$, $R^p$, $R^q$, and $R^t$ is independently hydrogen, halogen, oxygen, or $C_{1-12}$ organic group; I is a divalent oxygen, sulfur, or —N(Z)- wherein Z is hydrogen, halogen, hydroxy, $C_{1-12}$ alkyl, $C_{1-12}$ alkoxy, $C_{6-12}$ aryl, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused heteroaromatic ring.

6. The polycarbonate copolymer of claim 5, wherein the dihydroxy aromatic compound has the formula (10):

(10)

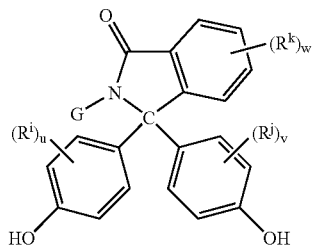

wherein $R^i$, $R^j$, and $R^k$ are independently $C_{1-12}$ hydrocarbyl, G is H, a $C_{1-12}$ alkyl, or $C_{6-18}$ aromatic group, and u, v, and w are each independently an integer from 0 to 4.

7. The polycarbonate copolymer of claim 6, where the dihydroxy aromatic compound has the formula (10a):

(10a)

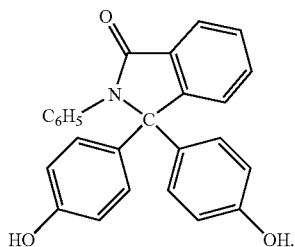

8. The polycarbonate copolymer of claim 1, where the dihydroxy aromatic compound has the formula (9):

(9)

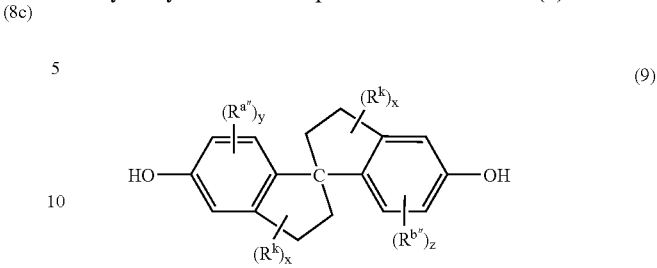

wherein $R^{a''}$, $R^{b''}$, and $R^k$ are independently $C_{1-12}$ hydrocarbyl, each x is independently an integer from 0 to 4, and y and z are each independently an integer from 0 to 3.

9. The polycarbonate copolymer of claim 1, where the dihydroxy aromatic compound has the formula (9a):

(9a)

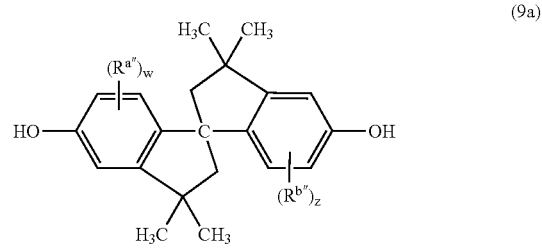

wherein $R^{a''}$, $R^{b''}$ are independently $C_{1-4}$ alkyl, $C_{1-4}$ alkoxy, and y and z are each independently 0 or 1.

10. The polycarbonate copolymer of claim 1, wherein the dihydroxy aromatic compound comprises at least one of 3,3-bis(4-hydroxyphenyl)-phthalimidine, phenolphthalein, 1,1-bis(4-hydroxyphenyl)fluorenone, 2,2-bis(4-hydroxyphenyl) adamantine, or 1,1-bis(4-hydroxyphenyl)-1-phenyl ethane.

11. The polycarbonate copolymer of claim 1 wherein n is 1; E corresponds to formula (2a), and X corresponds to formula (2b); m is 2 to 55; and n is 2 to 40.

12. The polycarbonate copolymer of claim 1 wherein n is 1; X corresponds to formula (2a) and E corresponds to formula (2b), m is 3 to 120; and m is 2 to 30.

13. The polycarbonate copolymer of claim 1, wherein structural unit A) is present in an amount of 0.1 to 30 percent by weight, based on the total weight of the polycarbonate copolymer.

14. The polycarbonate copolymer of claim 1, wherein structural unit A) is present in an amount of 5 to 30 percent by weight, based on the total weight of the polycarbonate copolymer.

15. The polycarbonate copolymer of claim 1, where the dihydroxy aromatic compound B) further comprises a second dihydroxy aromatic compound that is not identical to the first dihydroxy aromatic compound.

16. The polycarbonate copolymer of claim 1 wherein the second dihydroxy aromatic compound comprises a bisphenol of formula (4):

(4)

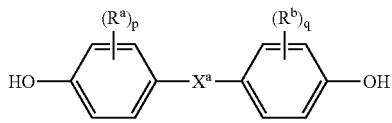

wherein $R^a$ and $R^b$ each represent halogen or $C_{1-12}$ alkyl and can be the same or different; p and q are each independently integers of 0 to 4, and $X^a$ is —O—, —S—, —S(O)—, $S(O)_2$—, or one of the groups of formula (5);

(5)

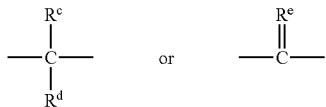

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group.

17. The polycarbonate copolymer of claim 16 wherein $R^c$ and $R^d$ are methyl, and p and q are 0.

18. The polycarbonate copolymer of claim 1 wherein an article with a thickness of 3.2 mm and molded from the polycarbonate copolymer has a haze of less than or equal to 5% according to ASTM D1003-00.

19. The polycarbonate copolymer of claim 1 wherein an article with a thickness of 3.2 mm and molded from the polycarbonate copolymer has a percent transmittance of greater than or equal to 70% according to ASTM D1003-00.

20. The polycarbonate copolymer of claim 1 wherein the surface contact angle of an article molded from the thermoplastic polycarbonate is less than or equal to 70 degrees.

21. The polycarbonate copolymer of claim 1, wherein an article molded from the polycarbonate copolymer has a % platelet adhesion that is less than that of a comparative article molded from bisphenol A polycarbonate.

22. A polycarbonate copolymer, comprising:
A) a structural unit derived from a dihydroxy alkylene oxide compound selected from the group consisting of formula (1a) and formula (1b):

 (1a)

 (1b)

wherein E and X are different and each and independently are selected from the group consisting of formula (2a) and formula (2b):

 (2a)

 (2b)

wherein R is a $C_1$-$C_8$ alkyl group; l, m, and n are integers greater than or equal to 1; and
B) a structural unit derived from a high-heat monomer comprising a dihydroxy aromatic compound of formula (7):

(7)

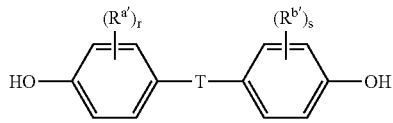

wherein $R^{a'}$ and $R^{b'}$ are each independently $C_{1-12}$ alkyl, T is a $C_{5-16}$ cylcloalkylidene or $C_{6-16}$ heterocycloarylene having up to three heteroatoms in the ring, wherein T is connected to at least one atom of each aromatic ring in the dihydroxy aromatic compound, wherein the heteroatoms include —O—, —S—, or —N(Z)-, and Z is hydrogen, halogen, hydroxy, $C_{1-12}$ alkyl, $C_{1-12}$ alkoxy, $C_{6-12}$ aryl, or $C_{1-12}$ acyl, wherein r and s are each independently 0 to 4, and wherein the polycarbonate comprises structural units derived from an activated aromatic carbonate,
wherein an article with a thickness of 3.2 mm and molded from the polycarbonate copolymer has a haze of less than or equal to 5% according to ASTM D1003-00.

23. The composition according to claim 22, wherein the activated aromatic carbonate is bis(methylsalicyl)carbonate.

24. The composition according to claim 22, wherein the structural units derived from the activated aromatic carbonate are end groups.

25. A thermoplastic composition comprising the polycarbonate copolymer of claim 1 and an additive.

26. A polycarbonate copolymer, consisting essentially of:
A) a structural unit derived from a dihydroxy alkylene oxide compound selected from the group consisting of formula (1a) and formula (1b):

 (1a)

 (1b)

wherein E and X are different and each and independently are selected from the group consisting of formula (2a) and formula (2b):

 (2a)

 (2b)

wherein R is a $C_1$-$C_8$ alkyl group; l, m, and n are integers greater than or equal to 1; and
B) a structural unit derived from a high heat monomer comprising a dihydroxy aromatic compound of formula (7):

(7)

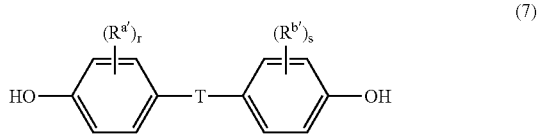

wherein $R^{a'}$ and $R^{b'}$ are each independently $C_{1-12}$ alkyl, T is a $C_{5-16}$ cylcloalkylidene or $C_{5-16}$ heterocycloarylene having up to three heteroatoms in the ring, wherein T is connected to at least one atom of each aromatic ring in the dihydroxy aromatic compound, wherein the heteroatoms include —O—, —S—, or —N(Z)-, and Z is hydrogen, halogen, hydroxy, $C_{1-12}$ alkyl, $C_{1-12}$ alkoxy, $C_{6-12}$ aryl, or $C_{1-12}$ acyl, and wherein r and s are each independently 0 to 4, wherein an article with a thickness of 3.2 mm and molded from the polycarbonate copolymer has a haze of less than or equal to 5% according to ASTM D1003-00.

27. A method of preparing a polycarbonate copolymer comprising copolymerizing:
A) a dihydroxy alkylene oxide compound selected from the group consisting of formula (1a) and formula (1b):

wherein E and X are different and each and independently are selected from the group consisting of formula (2a) and formula (2b):

wherein R is a $C_1$-$C_8$ alkyl group; l, m, and n are integers greater than or equal to 1; and
B) a high heat monomer comprising a dihydroxy aromatic compound of formula (7):

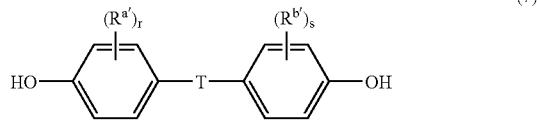

wherein $R^{a'}$ and $R^{b'}$ are each independently $C_{1-2}$ alkyl, T is a $C_{5-16}$ cylcloalkylidene, or $C_{5-16}$ heterocycloarylene having up to three heteroatoms in the ring, wherein T is connected to at least one atom of each aromatic ring in the dihydroxy aromatic compound, wherein the heteroatoms include —O—, —S—, or —N(Z)-, and Z is hydrogen, halogen, hydroxy, $C_{1-12}$ alkyl, $C_{1-12}$ alkoxy, $C_{6-12}$ aryl, or $C_{1-12}$ acyl, and wherein r and s are each independently 0 to 4; and
a carbonylating agent,
wherein an article with a thickness of 3.2 mm and molded from the polycarbonate copolymer has a haze of less than or equal to 5% according to ASTM D1003-00.

28. The method of claim 27, wherein the copolymerizing is done by an interfacial polymerization method, and the carbonylating agent is phosgene.

29. The method of claim 28, wherein the copolymerizing is done by a melt-polymerization method, the carbonylating agent is an aryl carbonate.

30. The method of claim 27, wherein a thermal stabilizer is included when copolymerizing.

31. The method of claim 27, wherein the aryl carbonate is phenyl carbonate or bis(methyl salicyl)carbonate.

32. A method comprising reacting together in the presence of a catalyst:
A) a dihydroxy alkylene oxide compound selected from the group consisting of formula (1a) and formula (1b):

wherein E and X are different and each and independently are selected from the group consisting of formula (2a) and formula (2b):

wherein R is a $C_1$-$C_8$ alkyl group; l, m, and n are integers greater than or equal to 1;
B) a high heat monomer comprising a dihydroxy aromatic compound of formula (7):

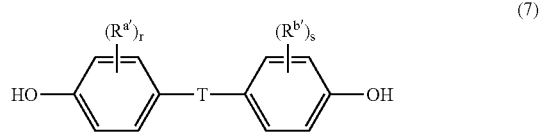

wherein $R^{a'}$ and $R^{b'}$ are each independently $C_{1-12}$ alkyl, T is a $C_{1-16}$ cylcloalkylidene or $C_{5-16}$ heterocycloarylene having up to three heteroatoms in the ring, wherein T is connected to at least one atom of each aromatic ring in the dihydroxy aromatic compound, wherein the heteroatoms include —O—, —S—, or —N(Z)-, and 7 is hydrogen, halogen, hydroxy, $C_{1-12}$ alkyl, $C_{1-12}$ alkoxy, $C_{6-12}$ aryl, or $C_{1-12}$ acyl, and wherein r and s are each independently 0 to 4; and
one or more activated diaryl carbonate of the formula 12:

wherein Ar is a substituted $C_{6-30}$ aromatic group,
wherein an article with a thickness of 3.2 mm and molded from the polycarbonate copolymer has a haze of less than or equal to 5% according to ASTM D1003-00.

33. The method according to claim 32, wherein the catalyst comprises: a) an alpha catalyst selected from the group consisting of alkali metal salts and alkaline earth metal salt; and b) a beta catalyst selected from the group consisting of a quaternary ammonium compound and a quaternary phosphonium compound.

34. The method according to claim 32, wherein the activated aromatic carbonate has formula (13):

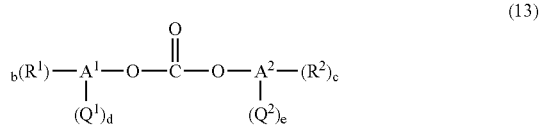

wherein $Q^1$ and $Q^2$ are each independently an activating group present on $A^1$ and $A^2$ respectively, positioned ortho to the carbonate linkage; $A^1$ and $A^2$ are each independently aromatic rings which can be the same or different; "d" and "e" have a value of 0 to a maximum equivalent to the number of replaceable hydrogen groups substituted on the aromatic rings $A^1$ and $A^2$ respectively, and the sum "d+e" is greater than or equal to 1; $R^1$ and $R^2$ are each independently a $C_{1-30}$ aliphatic group, a $C_{3-30}$ cycloaliphatic group, a $C_{5,-30}$ aromatic group, cyano, nitro or halogen; "b" has a value of 0 to a maximum equivalent to the number of replaceable hydrogen atoms on the aromatic ring $A^1$ minus "d"; and "c" is a whole number from 0 to a maximum equivalent to the number of replaceable hydrogen atoms on the aromatic ring $A^2$ minus "e".

35. The method according to claim 34, wherein the activated aromatic carbonate is bis(methylsalicyl)carbonate.

36. An article comprising the polycarbonate copolymer of claim 1.

* * * * *